United States Patent [19]

Beardsley et al.

[11] Patent Number: 6,167,459
[45] Date of Patent: Dec. 26, 2000

[54] SYSTEM FOR REASSIGNING ALIAS ADDRESSES TO AN INPUT/OUTPUT DEVICE

[75] Inventors: Brent Cameron Beardsley, Tucson, Ariz.; Allan Samuel Meritt, Poughkeepsie, N.Y.; Michael Aloysius Paulsen, Morgan Hill, Calif.; Harry Morris Yudenfriend, Poughkeepsie, N.Y.

[73] Assignee: International Business Machines Corporation, Armonk, N.Y.

[21] Appl. No.: 09/167,603

[22] Filed: Oct. 7, 1998

[51] Int. Cl.[7] .............................. G06F 13/00; G06F 13/10
[52] U.S. Cl. .................................. 710/3; 710/9; 711/202; 711/203
[58] Field of Search .................................. 710/3, 8, 9, 26, 710/29, 74, 116; 711/4, 141, 202, 203, 209

[56] References Cited

U.S. PATENT DOCUMENTS

| | | | |
|---|---|---|---|
| 3,949,380 | 4/1976 | Barbour et al. ...................... | 340/172.5 |
| 4,149,242 | 4/1979 | Pirz . | |
| 4,408,273 | 10/1983 | Plow . | |
| 4,453,211 | 6/1984 | Askinazi et al. . | |
| 5,095,420 | 3/1992 | Eilert et al. ...................... | 364/256.4 X |
| 5,097,410 | 3/1992 | Hester et al. . | |
| 5,119,290 | 6/1992 | Loo et al. .............................. | 711/210 |
| 5,197,069 | 3/1993 | Cook et al. . | |
| 5,261,072 | 11/1993 | Siegel . | |
| 5,274,773 | 12/1993 | Squires et al. . | |
| 5,276,826 | 1/1994 | Rau et al. . | |
| 5,333,315 | 7/1994 | Saether et al. . | |

(List continued on next page.)

FOREIGN PATENT DOCUMENTS

| | | |
|---|---|---|
| 58-056058 | 4/1983 | Japan . |
| 2082378 | 3/1990 | Japan . |

OTHER PUBLICATIONS

IBM 3990/9390 Storage Control; Document No. GA32–0274–04; Fifth Edition, Oct. 1996 (selected portions of Chapter 2).
IBM 3990 Storage Control Reference (Models 1, 2, and 3); Document No. GA32–0099–06, Seventh Edition, Oct., 1994 (selected portions of Chapters 1, 2, and 4).
IBM Technical Disclosure Bulletin Deleting Objects on Worm Media, vol. 32, No. 7, Dec. 1989.
IBM Technical Disclosure Bulletin Separate Write/Read Logical Paths to Optimize Library Network File System Data Rates, vol. 37, No. 09, Sep. 1994.
USSN 09/168,017, filed Oct. 7, 1998.
USSN 09/167,782, filed Oct. 7, 1998.
USSN 09/167,860, filed Oct. 7, 1998.
USSN 09/197,605, filed Oct. 7, 1998.

*Primary Examiner*—Thomas C. Lee
*Assistant Examiner*—Chun Cao
*Attorney, Agent, or Firm*—David W. Victor; Konrad Raynes & Victor, LLP

[57] ABSTRACT

Disclosed is a system for reassigning addresses. A first processing unit, such as a storage controller, provides at least two base addresses for addressing devices, such as volumes of a direct access storage device (DASD) and a plurality of alias addresses. An alias address associated with a base address provides an address for addressing the device addressed by the base address. The first processing unit processes a command transmitted from a second processing unit, such as a host system that accesses the DASD through the storage controller, to reassign an alias address from a first base address to a second base address. The first base address addresses a first device and the second base address addresses a second device. The first processing unit then indicates that the alias address to reassign is not associated with the first base address and is associated with the second base address. The second device addressed by the second base addresses is capable of being addressed by the reassigned alias address. The first processing unit signals the second processing unit after the first processing unit indicates that the alias address was reassigned from the first base address to the second base address.

41 Claims, 12 Drawing Sheets

U.S. PATENT DOCUMENTS

| | | |
|---|---|---|
| 5,392,443 | 2/1995 | Sakakibara et al. . |
| 5,404,474 | 4/1995 | Crook et al. . |
| 5,488,707 | 1/1996 | Phillips et al. . |
| 5,528,764 | 6/1996 | Heil . |
| 5,530,845 | 6/1996 | Hiatt et al. .......................... 395/500.48 |
| 5,530,897 | 6/1996 | Meritt . |
| 5,553,285 | 9/1996 | Krakauer et al. . |
| 5,564,052 | 10/1996 | Nguyen et al. ........................... 712/42 |
| 5,568,629 | 10/1996 | Gentry et al. . |
| 5,581,768 | 12/1996 | Garney et al. . |
| 5,640,591 | 6/1997 | Rosenthal et al. . |
| 5,664,152 | 9/1997 | Ezzett . |
| 5,680,580 | 10/1997 | Beardsley et al. . |
| 5,781,796 | 7/1998 | Lee ............................................... 710/8 |
| 5,860,138 | 1/1999 | Engebretsen et al. . |
| 5,892,929 | 4/1999 | Welker .................................... 710/107 |
| 5,974,519 | 10/1999 | Cho ......................................... 711/202 |
| 6,026,475 | 2/2000 | Woodman ................................ 711/202 |
| 6,061,774 | 5/2000 | Witek ...................................... 711/210 |

Fig. 5

| Channel Subsystem 20 | | | | | | | | | |
|---|---|---|---|---|---|---|---|---|---|
| Subchannel | 0 | 1 | 2 | 3 | ...7... | ...16... | ...22... | ...99... | |
| Unit Address (UA) | | | | | 14 | 25 | 333 | 12 | |
| Device No. | | | | | FFF0 | FF26 | 0053 | 0414 | |
| SCHIB | | | | | | | | | |

42

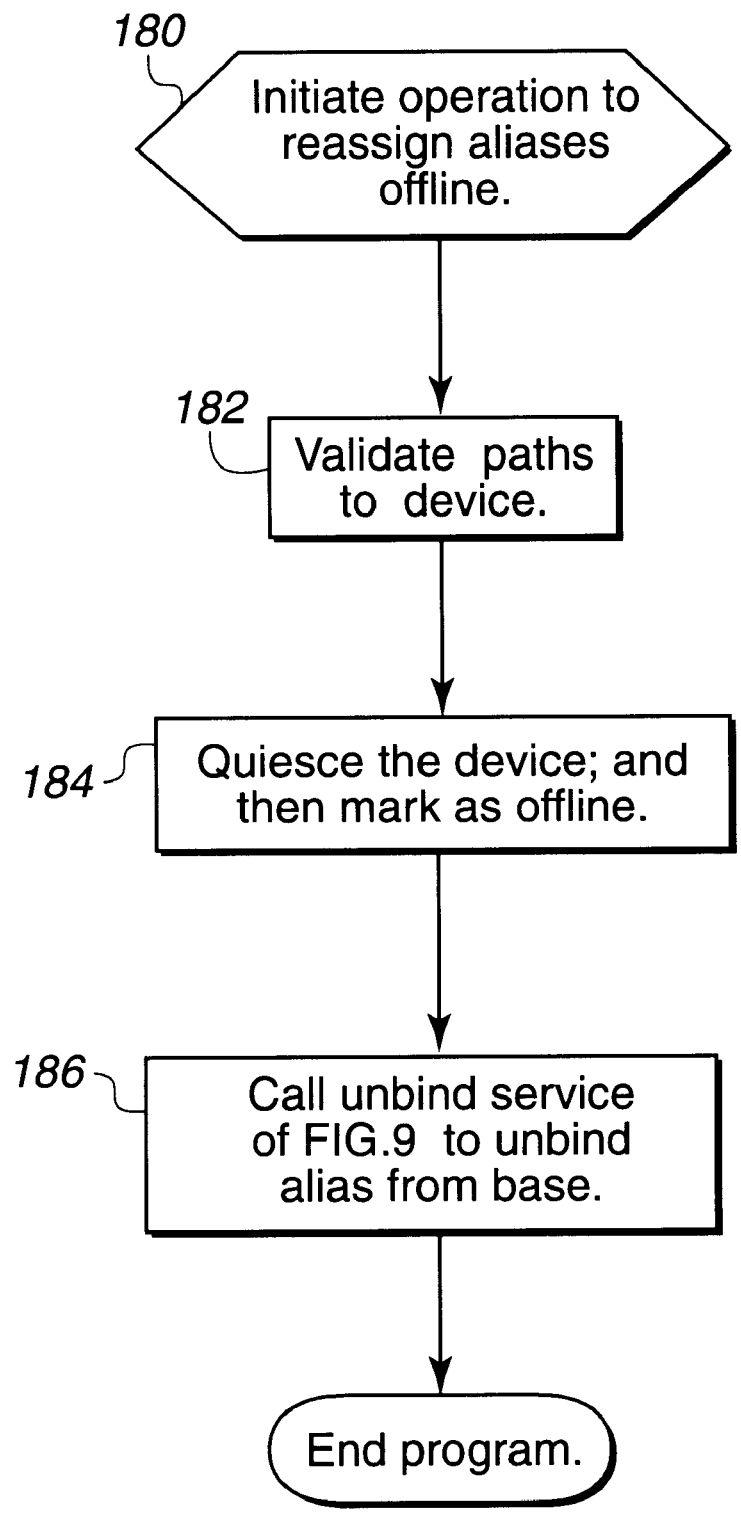

SYSTEM FOR REASSIGNING ALIAS ADDRESSES TO AN INPUT/OUTPUT DEVICE

CROSS-REFERENCE TO RELATED APPLICATIONS

This application is related to the following co-pending and commonly-assigned patent applications, all of which are filed on the same date herewith, and all of which are incorporated herein by reference in their entirety:

"System For Accessing An Input/Output Device Using Multiple Addresses," by Brent C. Beardsley, James L. Iskiyan, James McIlvain, Phillip R. Mills, Michael A. Paulsen, William G. Thompson, Harry M. Yudenfriend, U.S. application Ser. No. 09/168,017.

"Method And System For Dynamically Assigning Addresses To An Input/Output Device," by Brent C. Beardsley, Allan S. Merritt, Michael A. Paulsen, and Harry M. Yudenfriend, U.S. application Ser. No. 09/167,782; and "Input/Output Operation Request Handling in a Multi-Host System," by Brent C. Beardsley, Joseph C. Elliot, and James L. Iskiyan, U.S. application Ser. No. 09/167,860.

BACKGROUND OF THE INVENTION

1. Field of the Invention

The present invention relates to a method and system for reassigning alias to base addresses to provide multiple addresses to allow concurrent, multiple I/O operations directed toward the same I/O device.

2. Description of the Related Art

FIG. 1 illustrates a hardware environment of a channel subsystem 2 included in a host system 4 providing communication between CPUs 6a, b and I/O devices 10a, b, c. A storage controller 8 controls access to the I/O devices 10a, b, c. The host system 4 communicates with the storage controller 8 via the channel subsystem 2 and subchannels 14a, b, c therein. The host system 4 includes CPUs 6a, b that contain the sequencing and processing facilities for instruction execution, interruption action, timing functions, initial program loading, and other machine-related functions. The CPUs 6a, b may be host systems. The I/O devices 10a, b, c may be comprised of printers, magnetic-tape units, direct-access-storage devices (DASDs), displays, keyboards, communications controllers, teleprocessing devices, and sensor-based equipment. The storage controller 8 regulates and controls data transfers to the I/O devices 10a, b, c. The storage controller 8 function may be a separate stand alone machine, such as the IBM 3990 Storage Controller, or housed within the I/O device 10a, b, c or within the host system 4. In certain systems, the host system 4 may view the storage controller 8 as a multitude of separate control unit images or logical subsystems (LSSs), wherein each control unit image provides access to one or more I/O devices 10a, b, c. The storage controller 8 may include multiple control unit images, i.e., LSSs, each of which may address up to 256 I/O devices.

The CPUs 6a, b and the channel subsystem 2 may access a main storage 12. Programs and data maintained in the I/O devices 10a, b, c such as storage drives, must be loaded into the main storage 12 before the CPUs 6a, b can process such programs and data. The main storage 12 may include a fast access buffer or cache. I/O operations involve the transfer of data between the main storage 12 and the I/O devices 10a, b, c. The channel subsystem 2 directs the flow of data between the storage controller 8 and the main storage 12. The channel subsystem 2 relieves the CPUs 6a, b of handling I/O operations and permits the CPUs 6a, b to devote processing cycles to other operations while the channel subsystem 2 concurrently handles data transfers. In typical implementations, the CPUs 6a, b, the main storage 12, and the channel subsystem 2 are all located within a single host 4 that is attached to a single storage controller 8, such as the IBM 3990 Storage Controller.

Channel paths 13 provide data communication between the channel subsystem 2 and the storage controller 8. The channel paths 13 may employ a parallel-transmission protocol or a serial-transmission protocol. The storage controller 8 includes control logic to physically access the I/O devices 10a, b, c and control data transfer. In preferred embodiments, multiple channel paths 13 may be dedicated for communication with a particular I/O device 10a, b, c.

A subchannel 14a, b, c is dedicated to each I/O device 10a, b, c accessible to the channel subsystem 2, i.e., there is a one-to-one relationship between subchannels 14a, b, c and I/O devices 10a, b, c. Each subchannel 14a, b, c consists of internal storage and includes information relating the I/O devices 10a, b, c to the channel subsystem 2. The channel subsystem 2 uses the information in the subchannels 14a, b, c to access the I/O devices 10a, b, c. The subchannels 14a, b, c are assigned to the I/O devices 10a, b, c at initialization. The subchannels 14a, b, c maintain information such as the channel command word (CCW), channel-path identifier, device number, etc., concerning operations initiated with respect to the I/O device 10a, b, c represented by the subchannel 14a, b, c. I/O devices 10a, b, c that are attached to the channel subsystem 2 by multiple channel paths 13 may be accessed using any of the available channel paths 13. An I/O device 10a, b, c is addressed by channel-path identifiers (CHPIDs) identifying the path to a device, sub-channel numbers identifying the subchannel 14a, b, c associated with the device, and a device number uniquely identifying the I/O device 10a, b, c to the host system 4. The IBM S/390 operating system allows for dynamic-reconnection, wherein the storage controller 8 may select any channel path 13 leading to the host system 4 when logically reconnecting to the channel subsystem 2.

The main storage 12 includes unit control blocks (UCBs) which include information on the subchannels and I/O devices. The CPUs 6a, b may access the UCB information when initiating I/O operations.

The channel subsystem 2 may receive numerous I/O operations from CPUs 6a, b directed toward the I/O devices 10a, b, c. The channel subsystem 2 initiates a channel program which comprises a series of channel commands to access and perform the I/O operation requested by the host system 4. An I/O operation toward a volume operates through the execution of a series of linked channel command words (CCW). The CCW designates the storage area associated with the operation, the action to be taken whenever transfer to or from the area is completed, and other options. A CCW command includes different fields, including: a command code that specifies the operation to be performed, e.g., write, read, read backward, control, sense, sense ID, and transfer in channel; and an address field designating a location in absolute storage, otherwise referred to as a data storage address of where the I/O operations and commands are maintained in main memory 12, and chain command information specifying whether commands are chained together. With each chain of commands, a define extent command may be provided indicating the permissible I/O operations that may be performed and a locate record command indicating the actual I/O operation to be performed. The chain of CCW commands may operate within the defined extent range. A description of these commands is provided in the IBM publication, "IBM 3990/9390 Storage Control Reference," IBM Document no. GA32-0274-04 (Copyright IBM, 1994, 1996), which publication is incorporated herein by reference in its entirety.

A subchannel 14a, b, c establishes an active allegiance for a channel path when active communication is initiated with the I/O device 10a, b, c on the channel path. In current systems, the subchannel 14a, b, c can have an active allegiance to only one channel path at a time. While a subchannel 14a, b, c has an active allegiance on a channel path 13 to an I/O device 10a, b, c, the channel subsystem 2 does not actively communicate with that device on any other channel path. Thus, there is only one path of communication, and hence one channel program, directed toward an I/O device 10a, b, c at a given time even though there may be multiple dynamic channel paths 123leading to the I/O device 10a, b, c. Although dynamic channel pathing provides multiple paths from the channel subsystem 2 to the storage controller 8, only one of the dynamic paths is used at a time to communicate with the I/O device 10a, b, c. The dynamic paths are used to provide an alternative path for reconnecting the storage controller 8 and the I/O device 10a, b, c to the host system 4. In preferred embodiments, the storage controller 8 selects the path for reconnection. In the prior art, execution of a channel program for a single host system along multiple paths would likely create device-busy conditions detectable by the channel subsystem and cause unpredictable results.

Thus, with prior art servers employing the channel subsystem architecture of the IBM ESA/390 server and other similar server systems known in the art, a single host system cannot direct concurrent, multiple I/O operations toward the same volume, i.e., I/O device. In the current art, to execute multiple channel programs toward the same I/O device 10a, b, c the channel program operations must be queued and executed serially; multiple channel programs cannot be executed at once toward the same I/O device 10a, b, c. Otherwise, if the multiple I/O tasks return data from the same device to a single host, the host could not relate the data to the completed I/O task because the host cannot distinguish on the basis of the address of the target I/O device 6a, b. Prior art systems are described in the IBM publications "ESA/390 Principles of Operation," IBM document no. SA22-7201-04 (IBM Copyright 1990, 1991, 1993, 1994, 1996, 1997), and U.S. Pat. Nos. 5,197,069 and 5,530,897, assigned to IBM, which publications and patents are incorporated herein by reference in their entirety.

BRIEF DESCRIPTION OF THE FIGURES

Referring now to the drawings in which like reference numbers represent corresponding parts throughout:

FIG. 5 illustrates a data structure indicating subchannel information in accordance with preferred embodiments of the present invention;

FIG. 12 illustrates logic implemented in a host to reassign an alias address to a device offline in accordance with preferred embodiments of the present invention;

SUMMARY OF THE PREFERRED EMBODIMENTS

To overcome the limitations in the prior art described above, preferred embodiments disclose a method and system for reassigning addresses. A first processing unit provides at least two base addresses for addressing devices and a plurality of alias addresses. An alias address associated with a base address provides an address for addressing the device addressed by the base address. The first processing unit processes a command transmitted from a second processing unit to reassign an alias address from a first base address to a second base address. The first base address addresses a first device and the second base address addresses a second device. The first processing unit then indicates that the alias address to reassign is not associated with the first base address and is associated with the second base address. The second device addressed by the second base addresses is capable of being addressed by the reassigned alias address. The first processing unit signals the second processing unit after the first processing unit indicates that the alias address was reassigned from the first base address to the second base address.

In further embodiments, a first processing unit provides information indicating an association of alias addresses to base addresses. An alias address associated with a base address provides an address for addressing a device addressed by the base address. The first processing unit initiates a command to a second processing unit to reassign an alias address from a first base address to a second base address. The first base address addresses a first device and the second base address addresses a second device. The first processing unit processes a signal from the second processing unit and, in response thereto, requests from the second processing unit information indicating the assignment of the reassigned alias address to the second base address. The first processing unit further indicates that the alias address to reassign is not associated with the first base address and indicates that the alias address to reassign is associated with the second base address.

Preferred embodiments thus provide a method and system for reassigning alias addresses that provide an alternative address for addressing an I/O device addressed by a base address. This dynamic reassignment allows a systems operator to alter the assignment of base and alias addresses to optimize the assignment of addresses to the I/O devices.

DETAILED DESCRIPTION OF THE PREFERRED EMBODIMENTS

In the following description, reference is made to the accompanying drawings which form a part hereof, and in which is shown, by way of illustration, several embodiments of the present invention. It is understood that other embodiments may be utilized and structural changes may be made without departing from the scope of the present invention.

Hardware and Software Environment

Figure 1:
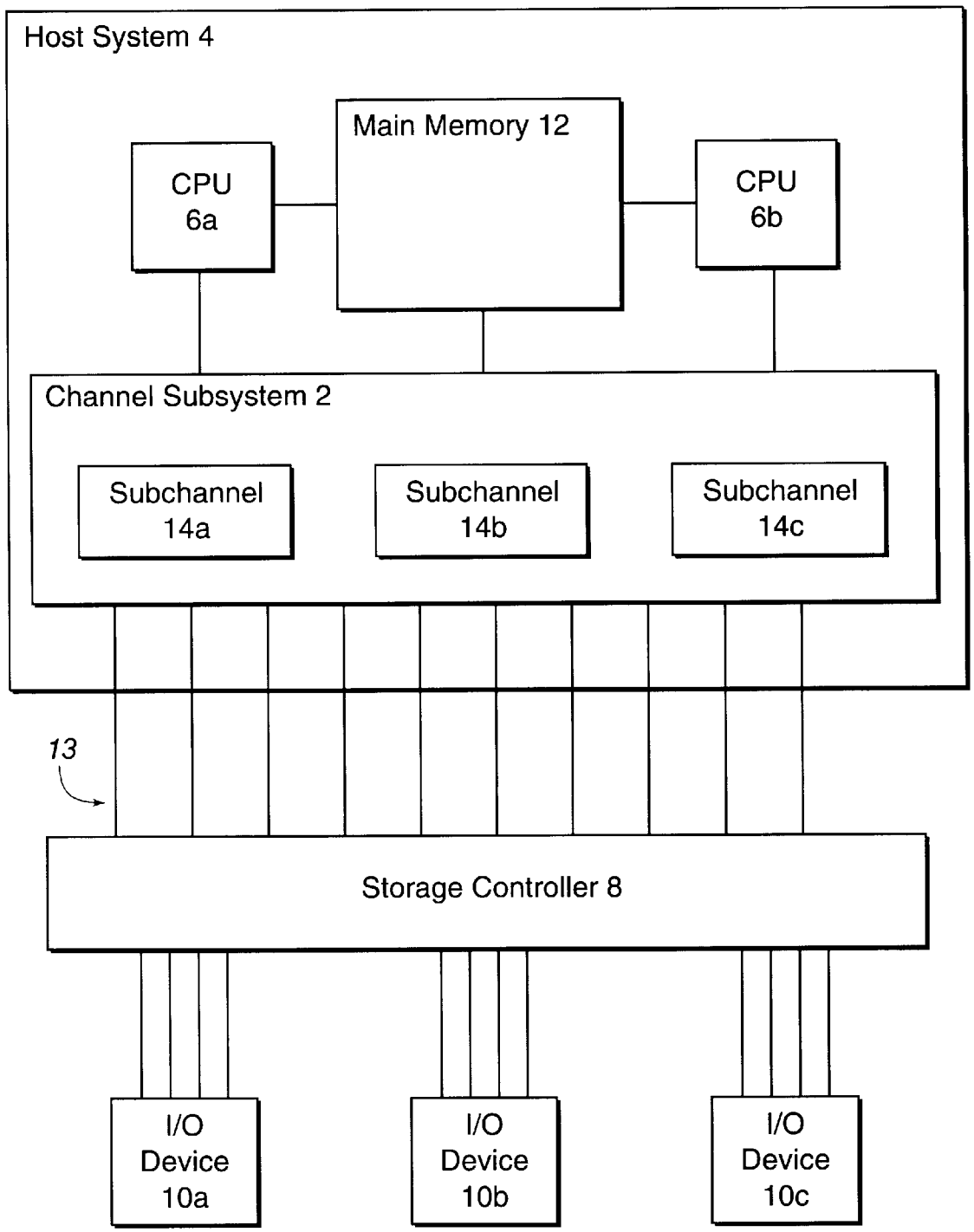
FIG. 1 illustrates a prior art system for handling I/O operations.
Figure 2:
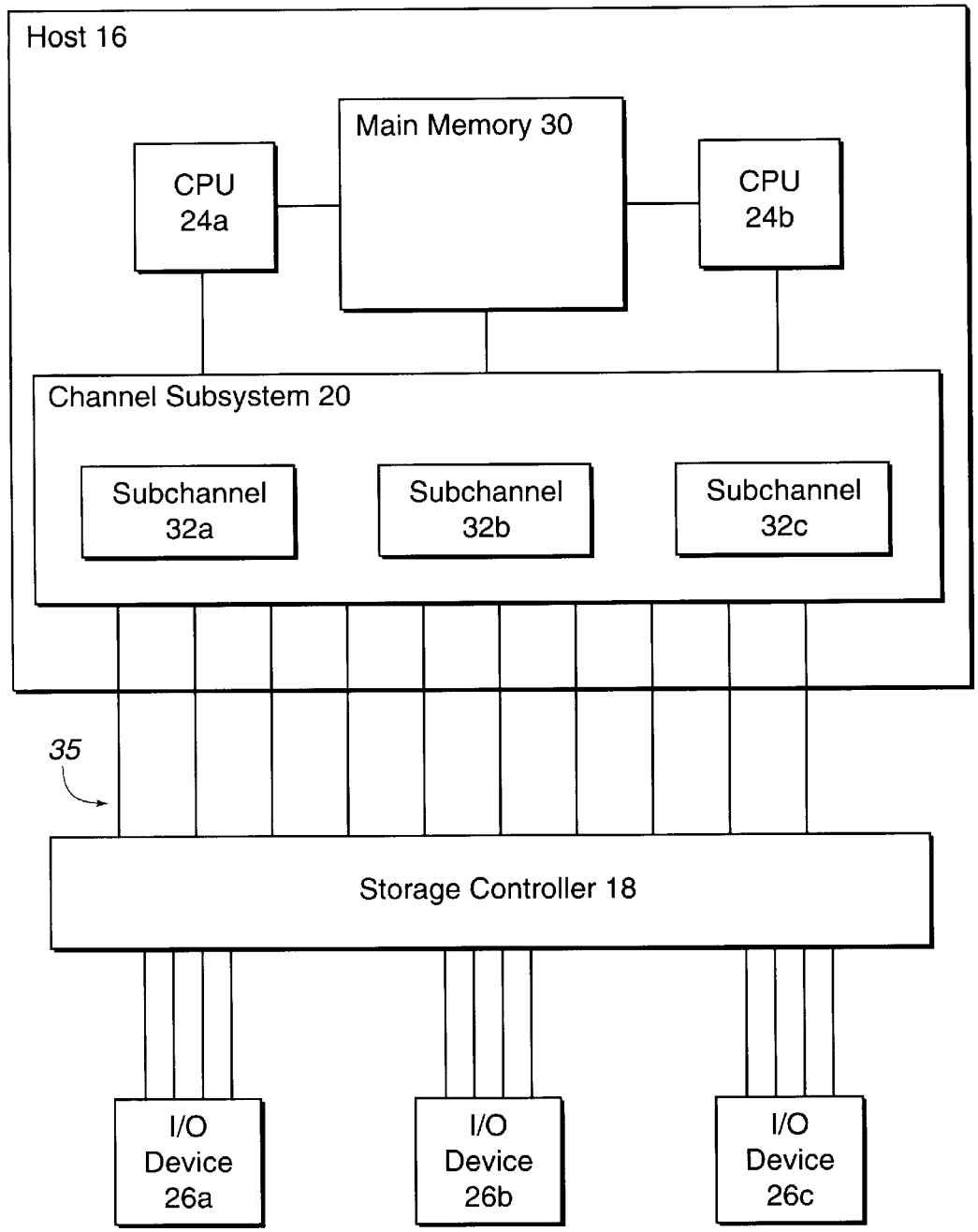
FIG. 2 illustrates a preferred hardware and software structure in which preferred embodiments of the present invention are implemented.

FIG. 2 illustrates a preferred hardware and software environment in which preferred embodiments are implemented. A host system 16 is in communication with a storage controller 18. The host system 16 views the storage controller 18 as a channel subsystem 20 that interfaces the CPUs 24a, b in the host 16 with I/O devices 26a, b, c. The host may have more than the two CPUs 24a, b shown in FIG. 2. Moreover, in preferred embodiments the CPUs 24a, b are capable of multi-tasking and each CPU 24a, b can simultaneously issue parallel execution paths. The channel subsystem 20 is the host 16 view of paths to the I/O devices 26a, b, c as represented by subchannels 32a, b, c. The host 16 would execute channel commands to manage the operation of the I/O devices 26a, b, c. Each I/O device 26a, b, c may be a particular volume of a direct access storage device (DASD). The storage controller 18 controls access to the I/O devices 26a, b, c. As discussed, the storage controller 18 may include multiple logical subsystems (LSSs), i.e., control unit images, wherein each LSS may address up to 256 devices. In alternative embodiments, there may actually be multiple storage controllers providing communication with different I/O devices 26a, b, c. The channel subsystem 20, which may be a construct maintained in the main memory 30 of the host 16, includes subchannels 32a, b, c that execute operations for the channel subsystem 20. Channel paths 35 provide data communication between the host 16 and storage controller 18.

The host 16 maintains unit control blocks (UCB) that include device (volume) identification information and a device number. A device number relates a unit control block (UCB) to a single subchannel 32a, b, c. The host 16 processes the UCB to determine the subchannel 32a, b, c for the I/O device 26a, b, c associated with the UCB. During initialization, each I/O device 26a, b, c is associated with a subchannel 32a, b, c. The host 16 processes the information in the subchannel 32 a, b, c to address an I/O operation to an I/O device 26a, b, c. In particular, the host 16 initiates an I/O operation toward an I/O device 26a, b, c by initiating a channel program which consists of a series of I/O instructions, such as a chain of CCW commands, on the subchannel 32a, b, c.

Each subchannel 32a, b, c further maintains a unit address corresponding to the device number which identifies the I/O device 26a, b, c to the storage controller 18. Thus, the subchannels 32a, b, c maintain device number and unit address information for the I/O device 26a, b, c associated with the subchannel 32a, b, c. For each base and alias address, a unit address, device number, subchannel, and UCB comprise a means for the host 16 to communicate with the I/O device 26a, b, c (volume). The UCB may also maintain status information on the associated I/O device 26a, b, c. The subchannel 32a, b, c is used to transmit the I/O operation to the storage controller 18 using the unit address associated with the selected subchannel 32a, b, c.

The storage controller 18 maintains a different view of the system. The storage controller 18 is provided a base unit address for each I/O device 26a, b, c (volume) and one or more alias unit addresses for each base unit address. As discussed, for each logical subsystem (LSS) within the storage controller 18, the 256 addresses for a LSS may be allocated in any manner between base and alias addresses. After assigning a base address to each I/O device, the remaining addresses can be allocated as alias addresses to the base addresses in any arrangement. The storage controller 18 uses the unit addresses to physically access the I/O devices 26a, b, c (volumes). In preferred embodiments, the structure of the storage controller 18 and interface between the storage controller 18 and host system 16 may be the storage controller 18 structure described in the following U.S. patent applications assigned to IBM: "Failover System for a Multiprocessor Storage Controller," to Brent C. Beardsley, Matt Kalos, Ronald R. Knowlden, U.S. Ser. No. 09/026,622, filed on Feb. 20, 1998; and "Failover and Failback System for a Direct Access Storage Device," to Brent C. Beardsley and Michael T. Benhase, U.S. Ser. No. 08/988,887, filed on Dec. 11, 1997, both of which applications are incorporated herein by reference in their entirety.

Base And Alias Addresses

Figure 3:
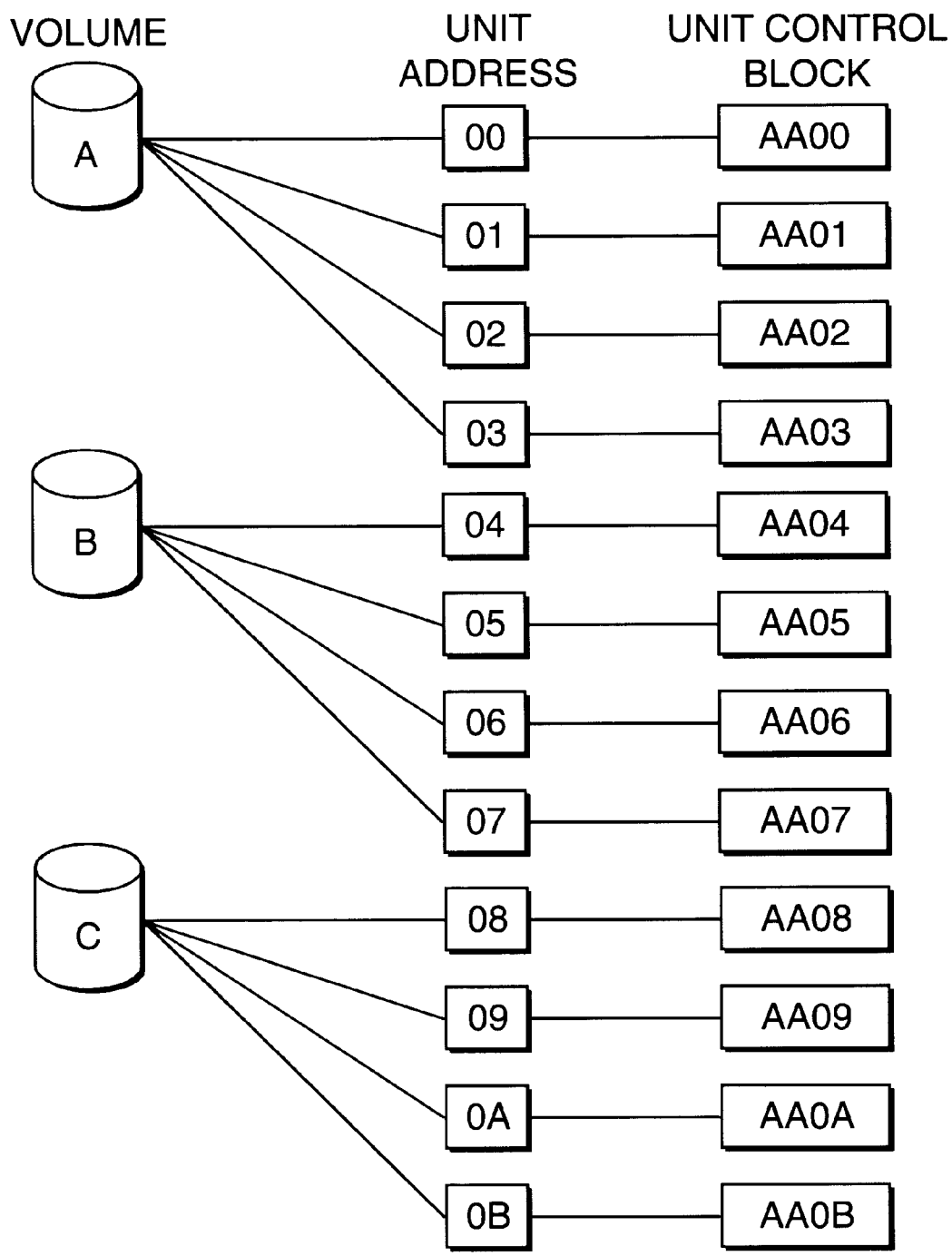
FIG. 3 illustrates how multiple addresses can relate to a single volume in accordance with preferred embodiments of the present invention.

FIG. 3 illustrates how a base and multiple alias addresses address an I/O device 26a, b, c in accordance with preferred embodiments of the present invention. In FIG. 3, the I/O device 26a, b is a volume in a storage device, such as a direct access storage device (DASD). For each base and alias address, there is a corresponding UCB and unit address. One of the unit addresses and UCBs is for the base address and the other three are the alias addresses. Each unit address and UCB corresponds to a single subchannel 32a, b, c which further relates to a plurality of channel paths 35 that link the channel subsystem 20 to the storage controller 18. A volume may be addressed with either the base or alias addresses associated with the volume. For instance, with reference to FIG. 3, volume A may be addressed using base unit address 00 and base UCB AA00, and alias unit addresses 01, 02, 03 and alias UCBs AA01, AA02, AA03. The main memory 30 includes a UCB for each alias address and base address assigned to a volume. The host 16, i.e., CPUs 24a, b, accesses the UCBs to determine the status of the I/O devices 26a, b, c. The UCBs in turn provide the subchannel 32a, b, c information, which further provides the unit address information needed for the I/O operation.

In preferred embodiments, every channel path 35 from the channel subsystem 20 provides a unique path to a volume (I/O device). An I/O operation or chain of CCW commands can be simultaneously executed toward the same volume using the different base and alias unit addresses for the volume. In this way, the executed CCW commands are all directed toward the same I/O device 26a, b, c using different addresses, wherein each address uses one of multiple channel paths 35 to reach a single volume or I/O device 26a, b, c. This allows a single host 16 to concurrently execute multiple I/O operations against a single volume. As discussed, alias addresses can be selectively allocated to base addresses that address particular I/O devices 26a, b, c as desired. The number of aliases provided for a base should be set according to the size of the volume and the number of concurrent users. In certain cases, only a few aliases may be needed to accommodate network traffic for a particular base address for an I/O device 26a, b, c.

The host 16 first attempts to access a volume (I/O device 26*a, b, c*) through the base UCB for the I/O device 26*a, b, c*. If the base UCB is unavailable, i.e., concurrently servicing another I/O operation, then the host 16 may use one of the available alias UCBs to concurrently access the I/O device 26*a, b, c*. The host system 16 then performs the I/O operations through the subchannel 32*a, b, c* associated with the UCB and the channel paths 35 provided for the subchannel 32*a, b, c*. When data is returned to the host system 16, the host system 16 can determine the I/O device 26*a, b, c* from which the return data came from the address. Thus, if multiple I/O operations are directed toward a single I/O device 26*a, b, c* concurrently along different subchannels using different UCBs, the host system 24*a, b* can handle multiple returns from the I/O operations because there are multiple UCBs associated with an I/O device 26*a, b, c* and, hence, multiple ways to associate the host 16 with an I/O device 26*a, b, c*. The host 16 may use multiple addresses to access the same volume as long as each channel program executed against one of the base or alias addresses does not try to update data used by another channel program accessing the same device.

Figure 4:
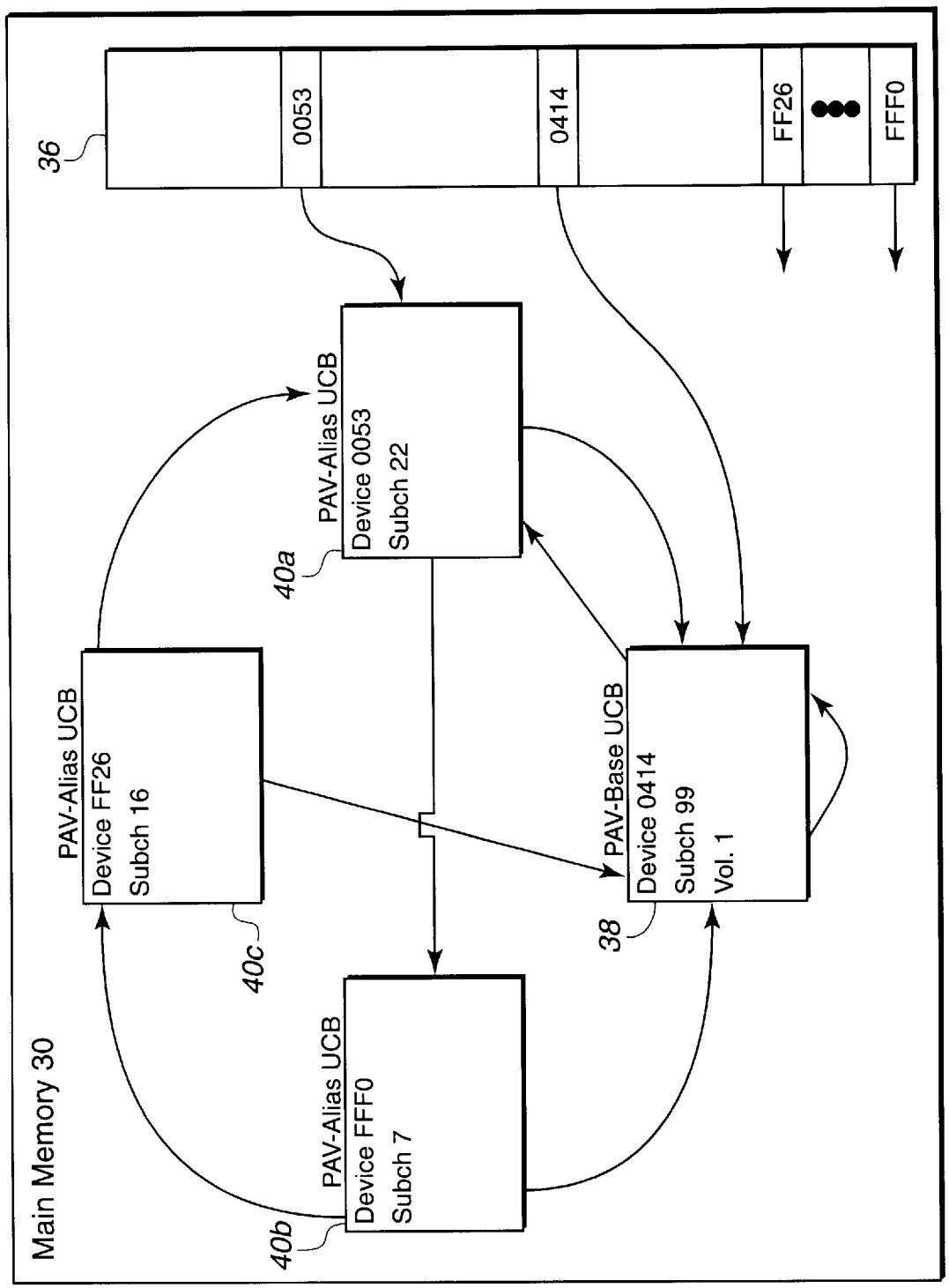
FIG. 4 illustrates a data structure indicating base and alias addresses in accordance with preferred embodiments of the present invention.

FIG. 4 illustrates the relationship of a universal look-up table (ULUT) 36 containing the device numbers which relate to base and alias UCBs. In preferred embodiments, the ULUT 36 and UCB data structures 38, 40*a, b, c* are maintained in the main memory 30 of the host 16. The base 38 and alias UCBs 40*a, b, c* bound to the base 38 include pointers to address each other. A bound alias UCB indicates that during configuration, the host 16 formally associated, i.e., bound, the alias UCB to a base UCB. If an alias UCB has not been associated with a particular base UCB, then that alias is unbound. Only bound alias UCBs can be used to address a particular I/O device 26*a, b, c* in lieu of the base UCB 38. In preferred embodiments, the ULUT 36 may also include fields indicating whether a particular UCB identified by the device number in the ULUT is bound or unbound and a base or alias.

The alias UCBs 40*a, b, c* form a circular chain, referred to herein as the parallel access volume (PAV) circular queue. For instance, device number 0414 references a base UCB 38 and device numbers 0053, FFF0, FF26, each reference an alias UCB 40*a, b, c,* respectively. The base UCB 38 addresses the first alias UCB bound to that base. Each of the alias UCBs 40*a, b, c* include a pointer addressing the next alias UCB in the chain and a pointer back to the base UCB 38 to which the alias UCB 40*a, b, c* is bound. The last bound alias 40*c* further includes a pointer addressing the first bound alias UCB 40*a*. The first bound alias UCB 40*a* includes a pointer to the next bound alias UCB 40*b*. In this way, the alias and base UCBs 38, 40*a, b, c* form a chain, i.e., circular queue, of linked UCBs. As shown in FIG. 4, each UCB 38, 40*a, b, c* includes the subchannel number of the corresponding subchannel that provides address information for the I/O device 26*a, b, c* (volume) associated with the UCB. In FIG. 4, the base UCB identifies the actual volume, Vol. 1, to which the base refers. U.S. Pat. No. 5,530,897, entitled "System for Dynamic Association of a Variable Number of Device Addresses With Input/Output Devices to Allow Increased Concurrent Requests for Access to the Input/Output Devices," assigned to IBM and which patent is incorporated herein by reference in its entirety, includes further description of the information maintained in the UCBs The base UCB 38 of a bound alias UCB, e.g., alias UCB 40*b*, can be identified from the ULUT 36 and the PAV circular queue. First, the ULUT 36 is used to locate the alias UCB 40*b*. Then the base UCB 38 may be identified from the pointer in the alias UCB 40*b* that addresses the base UCB 38. To obtain an address for an I/O operation, the host 16 would first attempt to use the base UCB 38 for the target volume. If the base UCB 38 is involved in an I/O operation or otherwise unavailable, then the pointer in the base UCB 38 to the first alias UCB 40*a* would be used to determine whether the first alias UCB 40*a* was available. If so, the first alias UCB 40*a* would be used to provide an address and subchannel for the I/O operation. Otherwise, the first available alias UCB in the PAV circular queue would be used to provide an address for addressing the volume.

FIG. 5 illustrates a table 42 maintained in the channel subsystem 20 including information for each subchannel. Each subchannel 32*a, b, c* is identified by a unique 16 bit number starting from 0. Each subchannel 32*a, b, c* includes the device number assigned to the UCBs maintained in the ULUT 36 that correspond to the subchannel and a unit address identifying the I/O device 26*a, b, c* (volume) to the subchannel. As discussed, a subchannel 32*a, b, c* provides the logical appearance of a device to the host 16 and contains the information required for sustaining I/O operations against an I/O device 26*a, b, c*. Each subchannel 32*a, b, c* includes a subchannel information block (SCHIB) that includes the channel path identifiers (CHPIDS) of the channel paths 35 associated with the subchannel 32*a, b, c*. The CHPID is a system-unique eight-bit value assigned to each installed channel path 35 of the system through which the I/O devices 26*a, b, c* may be reached. Each CHPID 35 identifies a physical channel path. A subchannel 32*a, b, c* provides multiple channel paths, each identified by a CHPID, which the subchannel 32*a, b, c* may use to communicate with the I/O devices 26*a, b, c*. In this way, each subchannel 32*a, b,* is associated with one UCB through the device number and the unit address. Each subchannel 32*a, b, c* provides a mechanism to the host 16 for accessing and addressing the I/O device 26*a, b, c* over the channel paths 35 associated with the subchannel. In this way, multiple subchannels may be used to access the same volume by accessing multiple subchannels leading to the same volume.

For instance, upon selecting a base 38 or alias 40*a, b, c* address to use for an I/O operation, the host 16 would determine the corresponding channel subsystem 32*a, b, c* from the UCB of the selected base or alias address. Using the table in the channel subsystem 20 illustrated in FIG. 5, the host system 16 could then determine the unit address. For instance, if the host system 16 selected alias UCB 40*b*, the host 16 would process the alias UCB 40*b* to determine the subchannel 7 for the address. From the table in FIG. 5, the host 16 would determine the unit address 14 for subchannel 7.

Figure 6:
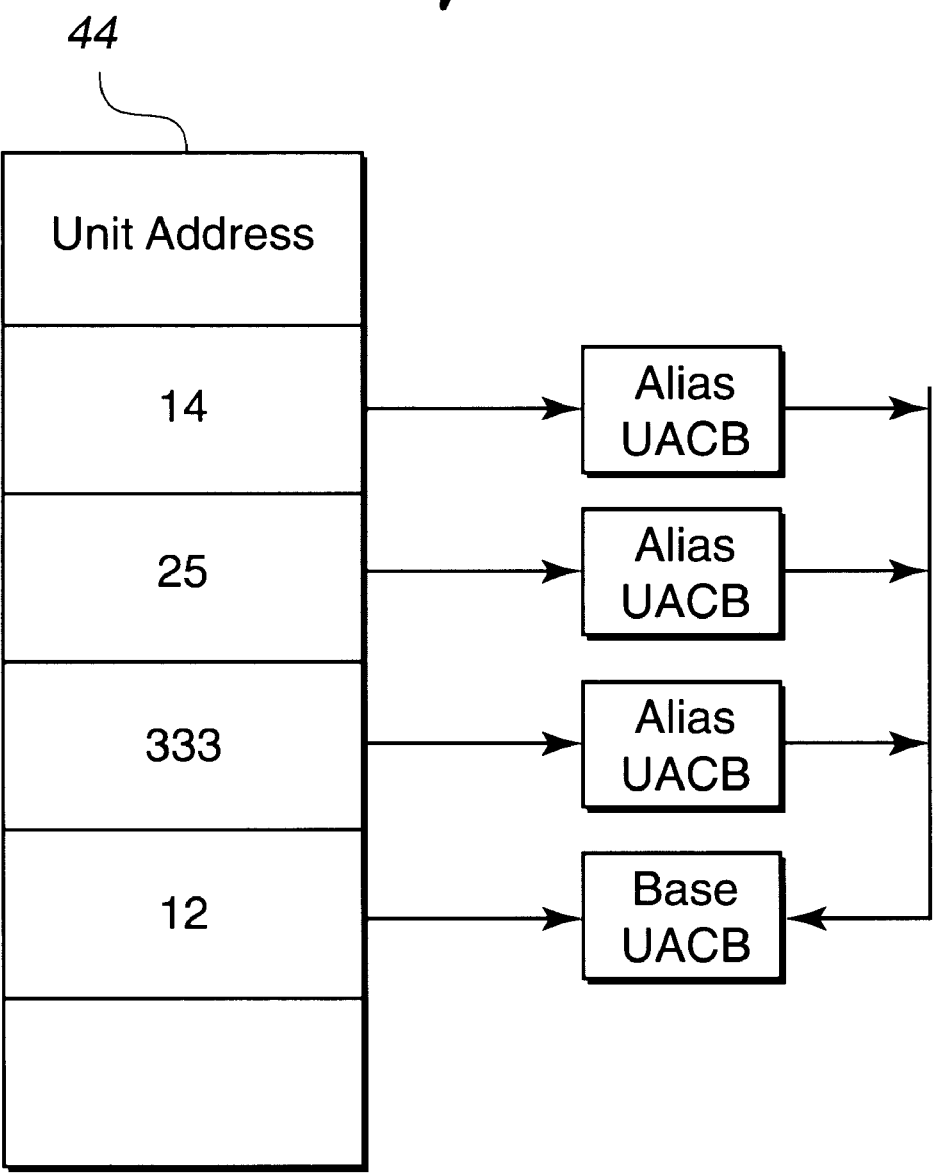
FIG. 6 illustrates a data structure indicating the relationship of unit addresses in accordance with preferred embodiments of the present invention.

When the host 16 executes an I/O operation on a subchannel 32*a, b, c*, the subchannel 32*a, b, c* provides the unit address of the target I/O device 26*a, b, c*. The channel subsystem 20, using the subchannel 32*a, b, c* information then transmits the I/O operation to the unit address associated with the subchannel 32*a, b, c*. The storage controller 18 then uses this unit address to execute the I/O operation. The storage controller 18 maintains a control block for each unit address, otherwise referred to as a unit address control block (UACB). This UACB includes status information on the I/O device 26*a, b, c* the unit address addresses. FIG. 6 illustrates a table 44 of unit addresses 14, 25, 333, 12 which point to the corresponding UACB for the unit address. The UACB identifies itself as a base or alias. The alias UACBs include a pointer to the base UACB for that alias. The storage controller 18 can determine the base unit address from the alias unit address by looking up the alias unit address in the table 44, locating the alias UACB from the pointer, and then determining the base UACB from the pointer in the alias UACB. The storage controller 18 would process the base UACB to determine the base unit address for the alias unit address that is the target of the I/O operation.

The storage controller 8 executes a task or I/O operation comprised of a chain of CCW commands by allocating a task control block including control information for an I/O operation, e.g., chain of CCW commands, and queuing the task control block against a base UACB. In this way, a multitude of tasks represented by task control blocks can be queued against a single volume (I/O device 26a, b, c). The task control block includes information needed to execute the chain of commands, such as the unit address, base or alias, that is the target of the task, and any other control information needed to complete the task and return the data to the host system 4.

If the I/O operation is directed toward an alias unit address, the storage controller 18 processes the alias UACB to determine the base unit address from the pointer in the alias UACB to the base UACB. The storage controller 18 then queues the I/O operation, i.e., task control block, against the located base unit address identified in the base UACB. The storage controller 18 queues multiple I/Os against the same base address. If there are multiple paths to the I/O device 26a, b, c (volume) identified by the base unit address, then the storage controller 18 may execute multiple I/O operations in parallel on the multiple paths. Although the storage controller 18 executes the I/O operation against the base unit address, when an I/O operation requires an attention or return message, the storage controller 18 uses the initial alias unit address associated with the I/O operation when returning a message or data to the host system 16.

The host 16 may issue a reserve command to reserve an I/O device 26a, b to prevent other hosts from accessing the I/O device 26a, b, c (volume). The reserve command provides a host exclusive access to a volume. For instance, to allocate a data set, the host system 16 could issue a command to reserve the volume including the data set, read a volume table of contents (VTOC) to determine if the volume the host wants to reserve is available, update the VTOC, and release the volume. Once reserved, no other host can access the volume until the reserving host releases the volume by writing a release to the VTOC. Once reserved, only the reserving host can issue I/O against. When a volume is reserved, the storage controller 18 would reserve all base and alias unit addresses addressing the reserved I/O device 26a, b, c. In preferred embodiments, a host may only issue a reserve command against the base address. No other host can access the volume or I/O device 26a, b, c until the reserving host writes to the VTOC to indicate that the volume is available.

In preferred embodiments, the host 16 and storage controller 18 maintain separate views of the system. For instance, the storage controller 18 has no knowledge of the channel subsystem 20, subchannels 32a, b, UCBs, etc., which are part of the host 16 view.

Configuration Data Records

The host 16 obtains information on the arrangement of the PAV devices by issuing a Read Configuration Data (RCD) command to an I/O device 26a, b, c. In response, the storage controller 18 provides Configuration Data Records (CDR) indicating the addressing, status, and control information for the device. In preferred embodiments, there is one CDR per channel path to an I/O device 26a, b. A CDR includes a variable number of 32 byte fields called node-element descriptors (NED). A node element is any identifiable entity in the system, e.g., volume, RAID Rank, cluster, subsystem, etc. The NED contains data that uniquely describes the node element. The CDR further includes a token NED which identifies the CDRs associated with a logical subsystem (LSS). All the CDRs for a particular LSS, i.e., control unit image, have the same token NED. A storage cluster is a power and service region that runs channel commands and controls the storage devices. Each storage cluster contains both channel and device interfaces. Storage clusters also perform the DASD controller functions.

The main memory 30 includes a configuration data table (CDT) which is comprised of the CDRs for each subchannel 32a, b, c. The host 16 may access this table to access CDR records. Table 1 below shows a preferred embodiment of the fields included in the CDR data structure for an alias UCB in accordance with preferred embodiments of the present invention. The Node Element Qualifier (NEQ) describes the paths and addressees for a particular device, controller, volume, etc. A further description of the NED and NEQ fields are described in IBM document "Storage Subsystem Library: IBM 3990 Storage Control Reference (Models 1, 2, and 3)", IBM document no. GA32-0099-06, (IBM Copyright 1988, 1994) and U.S. Pat. No 5,191,069, assigned to IBM, which publication and patent are incorporated herein by reference in their entirety.

TABLE 1

| FIELD | DESCRIPTION |
| --- | --- |
| 1 | Node Element Descriptor (NED) of the Volume |
| 2 | Node Element Qualifier (NEQ) for the Volume NED. |
| 3 | NED 2, which describes the RAID rank information for the volume. |
| 4 | NED 3 contains the NED for the cluster that the system adaptor resides in. |
| 5 | NED 4 describes the physical subsystem |
| 6 | NEQ, that describes the paths and addresses |

Table 2 below describes fields included in the NEQ field in the CDR when the stem supports PAV base and alias addresses in accordance with preferred embodiments of the present invention.

TABLE 2

| FIELD | DESCRIPTION |
| --- | --- |
| 1 | Flags |
| 2 | Unit Address Flags for the DASD, indicating whether unit address is base address or alias address |
| 3 | Alias Address Parameters. When the unit address is an Alias address, as indicated in Field 2, this field contains the base unit address to which the alias address is bound. |

The NEQ indicates the unit address associated with the device number and subchannel and whether the unit address associated with the CDR is a base or alias. When the unit address is an alias, the third field of the NEQ indicates the base unit address of the I/O device 26a, b, c associated with the alias. The CDT further maintains a subsystem control block (SSCB) which identifies the channel subsystem 20. All CDRs are grouped according to the SSCB. Each UCB addresses the SSCB containing the paths to the I/O device 26a, b, c represented by the UCB.

Table 3 below illustrates the CDR record generated for base addresses and single access volumes (SAVs) which do not have alias addressing capabilities.

TABLE 3

| FIELD | DESCRIPTION |
|---|---|
| 1 | Node Element Descriptor (NED) of the Volume |
| 2 | NED 2, which describes the RAID rank information for the volume. |
| 3 | NED 3 contains the NED for the cluster that the system adaptor resides in. |
| 4 | NED 4 contains the token NED for the subsystem. |
| 6 | NEQ, that describes the paths and addresses |

During initialization, the host 16 issues the RCD commands to obtain the CDR data from the storage controller 18 for each subchannel 32a, b, c. The host 16 furthers issues a set system characteristics command to the storage controller 18 to inform the storage controller 8 of the host 16 capabilities, including whether the host 16 supports PAV.

Initialization

In preferred embodiments, a systems operator may encode in the storage controller 18 the structure of the system, including the I/O devices 26a, b, c (volumes), logical subsystem (LSS) information, the base addresses, the alias addresses, the number of channel paths 35 between the storage controller 18 and the channel subsystem 20, the subchannels 32a, b, c, the device numbers, the unit addresses, etc. As discussed, the device number identifies a subchannel 32a, b, c and corresponding I/O device 26a, b, c to the host 16 and the unit address identifies the I/O device 26a, b, c to the storage controller 18. In preferred embodiments, the operator defines the base and alias addresses independently, i.e., the operator does not specify the relationship of aliases to bases. Thus, no binding of base and aliases is implied by the user defined parameters.

Thus, the storage controller 18 maintains the settings, including control units, device addresses, unit addresses, alias addresses, base addresses, channel paths etc. defined by the operator. In preferred embodiments, the storage controller 18 does not have to proceed through initialization to determine the alias and base configurations as does the host 16.

In a static assignment system, once the user defines the alias and base addresses at the storage controller 18, the alias and base addresses remain permanently assigned to specific I/O devices and the channel paths connecting thereto. In such static assignment systems, the relationship between the base and alias addresses is defined by the user for both the host system 16 and storage controller 18 levels. In alternative embodiments, the relationship between the base and alias addresses may be dynamic, which means that the user may dynamically reassign alias addresses to different base addresses.

With dynamic binding systems, during configuration, the host 16 will issue RCD commands to obtain the CDRs describing the I/O devices 26a, b, c and device numbers, unit addresses, and base and alias addresses maintained at the storage controller 18. For each base and alias address, the host 16 will generate UCBs from the CDRs received from the storage controller 18. The host 16 will then bind the alias to base UCBs based on the CDR information received from the storage controller 18. In this way, the host 16 maintains the binding of base and alias addresses for all I/O operations subsequent to the initialization. If an operator reassigns the alias and base addresses at the storage controller 18, then the host 16 would again issue RCD commands to obtain the CDR records describing the new alias and base relationship. The host 16 would then bind the alias and base addresses according to the new relationship indicated in the read CDR records. The binding sets a relationship between a particular UCB and a unit address for the host 16 view. In this way, the binding of alias and base addresses would be available for all subsequent I/O operations. Related IBM patent applications "Method and System for Dynamically Assigning Addresses to an Input/Output Device," U.S. application Ser. No. 09/167,782, which application was incorporated by reference in its entirety above, describes systems for dynamically assigning alias addresses to base addresses.

At the time the host 16 initiates an I/O operation, a data path is formed consisting of one alias or base UCB, one subchannel, one channel, and one unit address. The host 16 would select a particular base or alias UCB to use for the I/O operation.

Those skilled in the art will appreciate that there are alternative methods for assigning base and alias addresses to particular I/O devices (volumes).

Reassigning Alias Addresses

A systems operator at the host 16 may execute a command to the storage controller 18 to reassign an alias address from one base address to another base address within a logical subsystem (LSS). This command would be issued on the alias address to be changed. Table 4 below illustrates the fields or parameters included in the Reassign Alias Address command.

TABLE 4

| FIELD | DESCRIPTION |
|---|---|
| 1 | The alias address to change |
| 2 | The current base address for the alias address to change. |
| 3 | The new base unit address. |

The storage controller 18 then changes the unit address configuration to indicate that the unit address of the alias address to change is no longer associated with the current base unit address and is associated with the new base unit address. For instance, the storage controller 18 would have to modify the table of unit addresses 44 illustrated in FIG. 6 to reflect the new relationship of base to alias addresses resulting from the Reassign Alias Address command. The storage controller 18 would have to modify the pointer in the reassigned alias UACB to address the UACB for the new base unit address. The storage controller 18 may also modify other status information in the control block to reflect the new assignment of the reassigned alias address.

Figure 7:
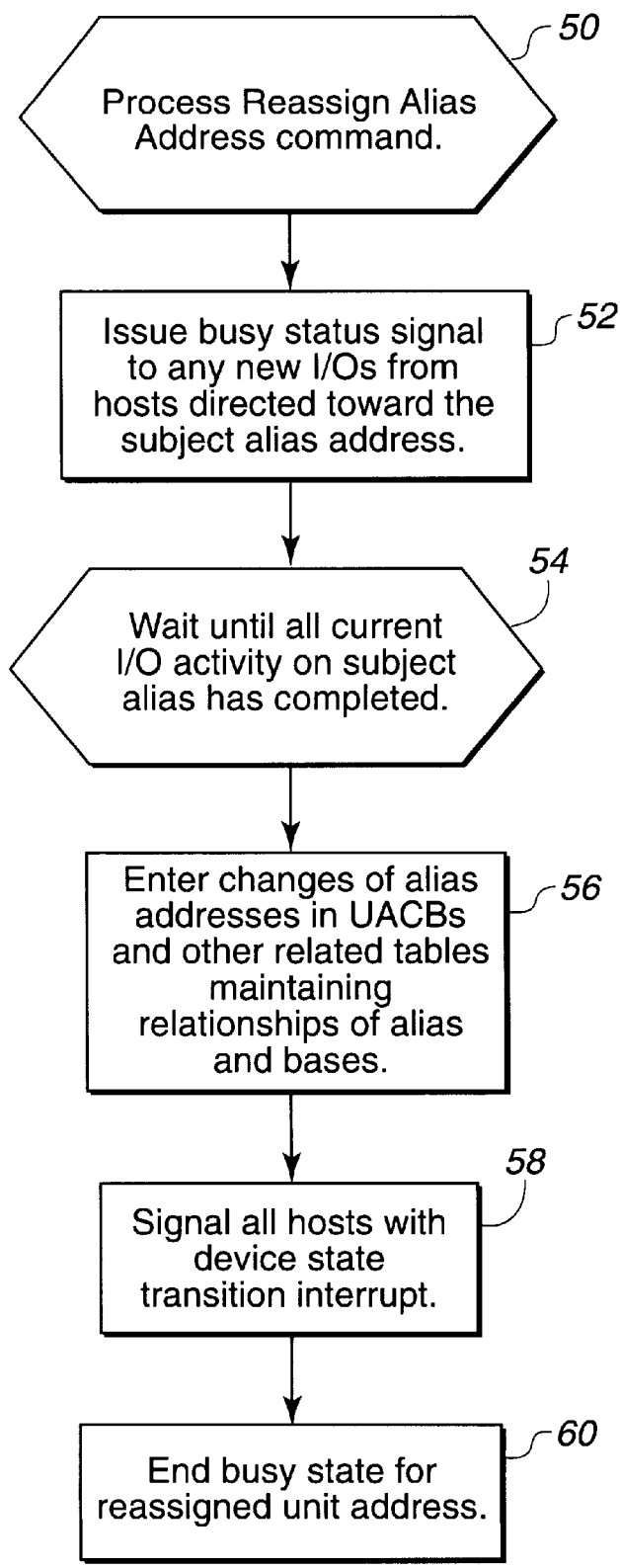
FIG. 7 illustrates logic to handle I/O operations in accordance with preferred embodiments of the process a command to reassign an alias address in accordance with preferred embodiments of the present invention.

FIG. 7 illustrates logic executed by the storage controller 18 to process the Reassign Alias Address command. The logic may be implemented as hardwired logic in a ROM or as software in an application program or the operating system of the storage controller 18. Control begins at block 50 which represents the storage controller processing a Reassign Alias Address command transmitted from a host 16. Control transfers to block 52 which represents the storage controller 18 issuing a busy status signal to any host 16 attached to the storage controller 18 sending an I/O request on the subject alias address to reassign. This busy signal prevents any I/Os on the alias address while it is in the process of being reassigned. Control transfers to block 54 which represents the storage controller 18 waiting unit all current I/O operations executed on the subject alias address have completed.

Control then transfers to block 56 which represents the storage controller 18 indicating the change of the subject alias address from the current base address, as indicated in the second field of the Reassign Alias Address command, to the new base address, indicated in the third field of the Reassign Alias Address command. For instance, the storage controller 18 may adjust the pointer in the reassigned alias UACB to address the new base UACB and not the current base UACB. After indicating the reassignment within the storage controller 18, control transfers to block 58 where the storage controller signals all attached hosts 16 with a device state transition unsolicited interrupt indicating a change in the relationship of base and alias addresses. Control then transfers to block 60 which represents the storage controller 18 ending the busy state signal on the reassigned alias address to allow I/O requests on the reassigned alias address.

FIGS. 8–12 illustrate logic executed within the host(s) 16, as hardwired logic in a ROM or as software in an application program or the operating system, to perform reassignment operations. Upon receiving the device state transition interrupt generated by the storage controller 18 at block 58 in FIG. 7, the host 16 executes the logic of FIG. 8 to initialize the reassignment in the host 16 system. With respect to FIG. 8, control begins at block 70 which represents each host 16 attached to the storage controller 18 receiving an unsolicited interrupt of a device state transition, indicating a reassignment of an alias address. In preferred embodiments, the interrupt is received on the reassigned alias address to indicate to the host(s) 16 the address that was reassigned. Control transfers to block 72 which represents each attached host issuing a command, i.e., a read configuration data (RCD) command, to read self-description data (CDR) records for the reassigned alias address indicating the new base associated with the alias address. Control then transfers to block 74 to call the unbind routine, illustrated in FIG. 9. Control then transfers to block 78 to bind the alias to the new base as described with respect to FIG. 10. Control transfers to block 82 to end the process.

Figure 8:
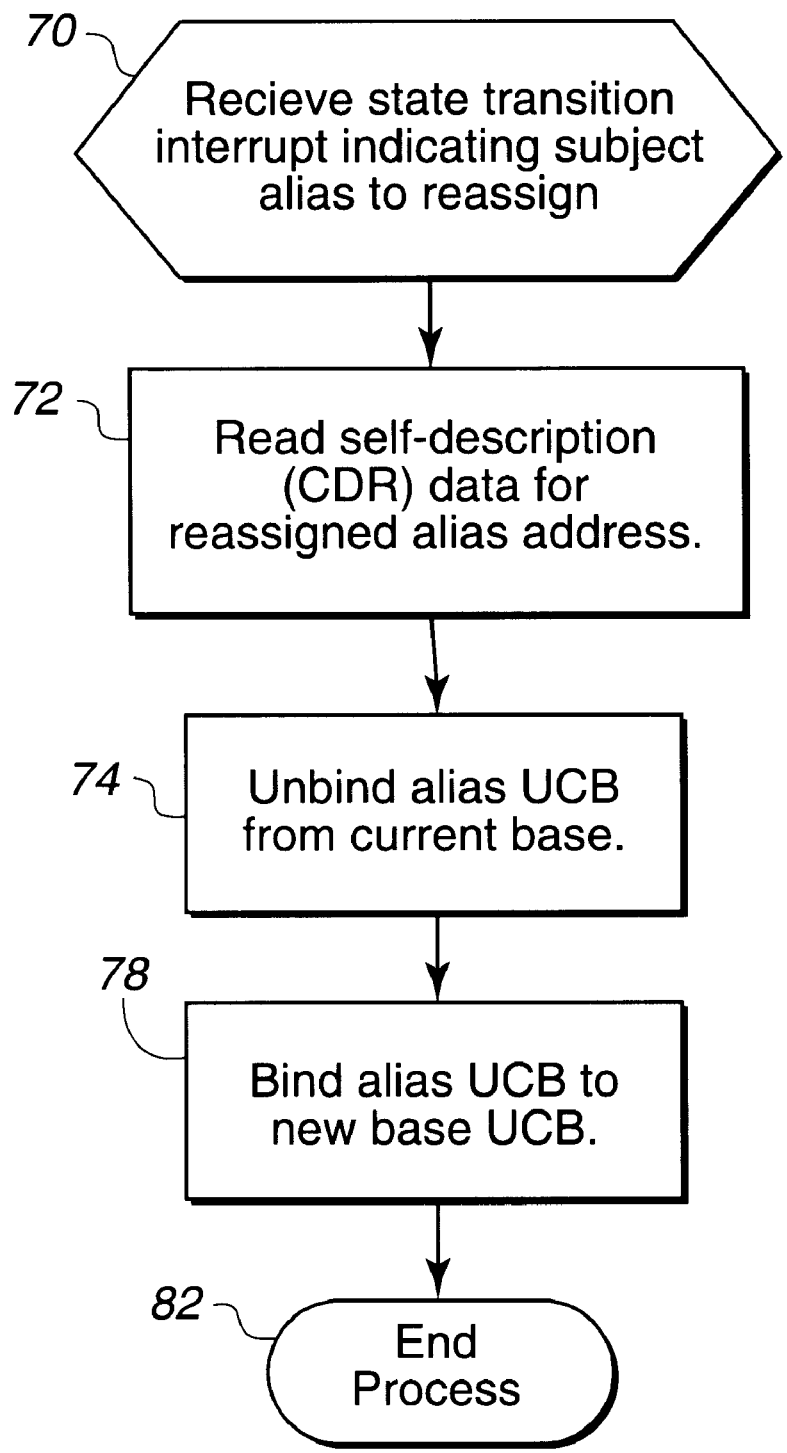
FIG. 8 illustrates logic implemented in a host to process a device state transition interrupt to reassign an alias address in accordance with preferred embodiments of the present invention.
Figure 9:
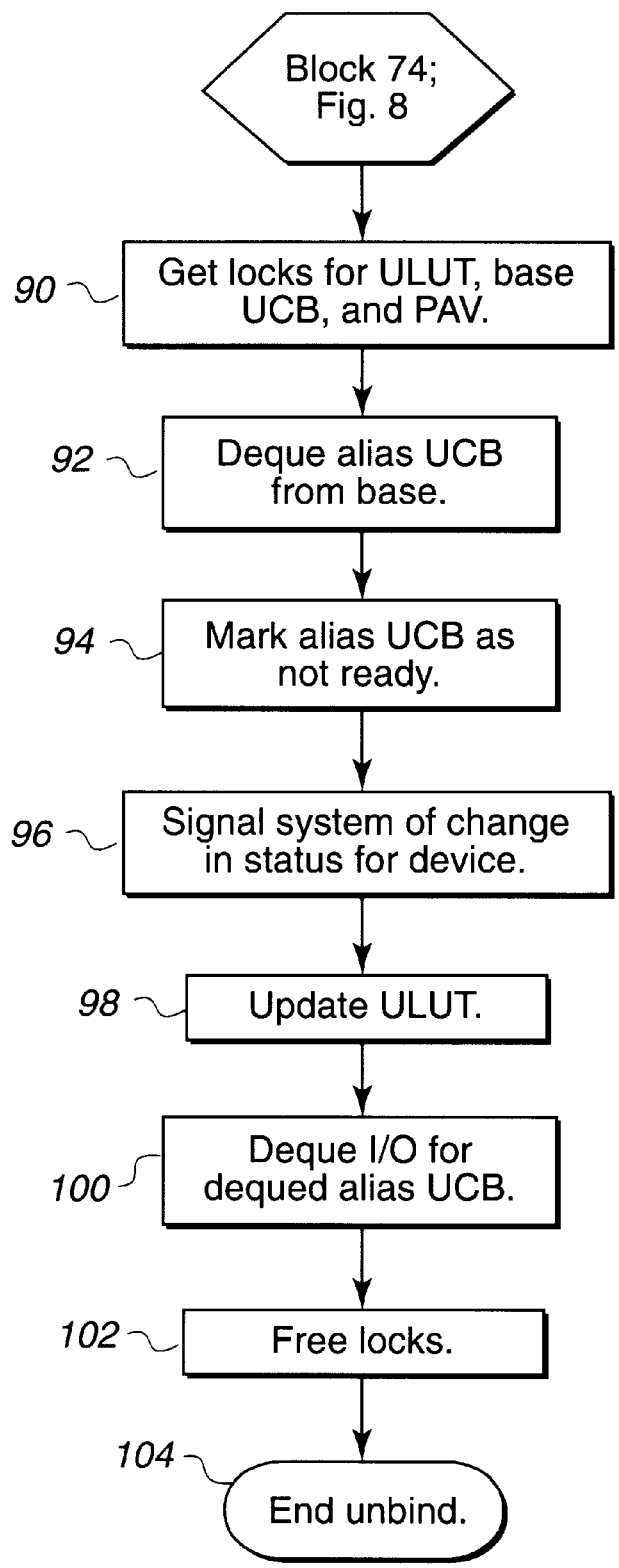
FIG. 9 illustrates logic implemented in a host to unbind an alias from a base address in accordance with preferred embodiments of the present invention.

FIG. 9 illustrates logic to perform the step of unbinding the alias to reassign from the current base at block 74 in FIG. 8. To unbind an alias UCB, control begins at block 90, which represents the host 16 obtaining locks for the ULUT 36, the base UCB to which the alias UCB is currently bound, and the PAV facility. Control transfers to block 92 which represents the host 16 dequeueing the alias UCB from the current base. The host 16 would go through the circular PAV queue and remove the address from the alias or base UCB pointing to the alias UCB to unbind the alias UCB. If an alias UCB was pointing to the alias UCB to unbind, then the host 16 would have the alias UCB point to the base or alias UCB the alias to unbind was addressing. After dequeueing the alias UCB from the PAV circular queue, control transfers to block 94 which represents the host 16 marking the alias UCB as not ready or unavailable. Control then transfers to block 96 which represents the host 16 signaling the system of the change in status for the device. Control transfers to block 98 which represents the host 16 updating the ULUT 36 to indicate that the alias UCB dequeued is not binded. Control transfers to block 100 which represents the host 16 dequeueing I/O requests to the dequeued alias UCB. Control then proceeds to block 102 to free all the locks and then to block 104 to end the unbind procedure.

Figure 10:
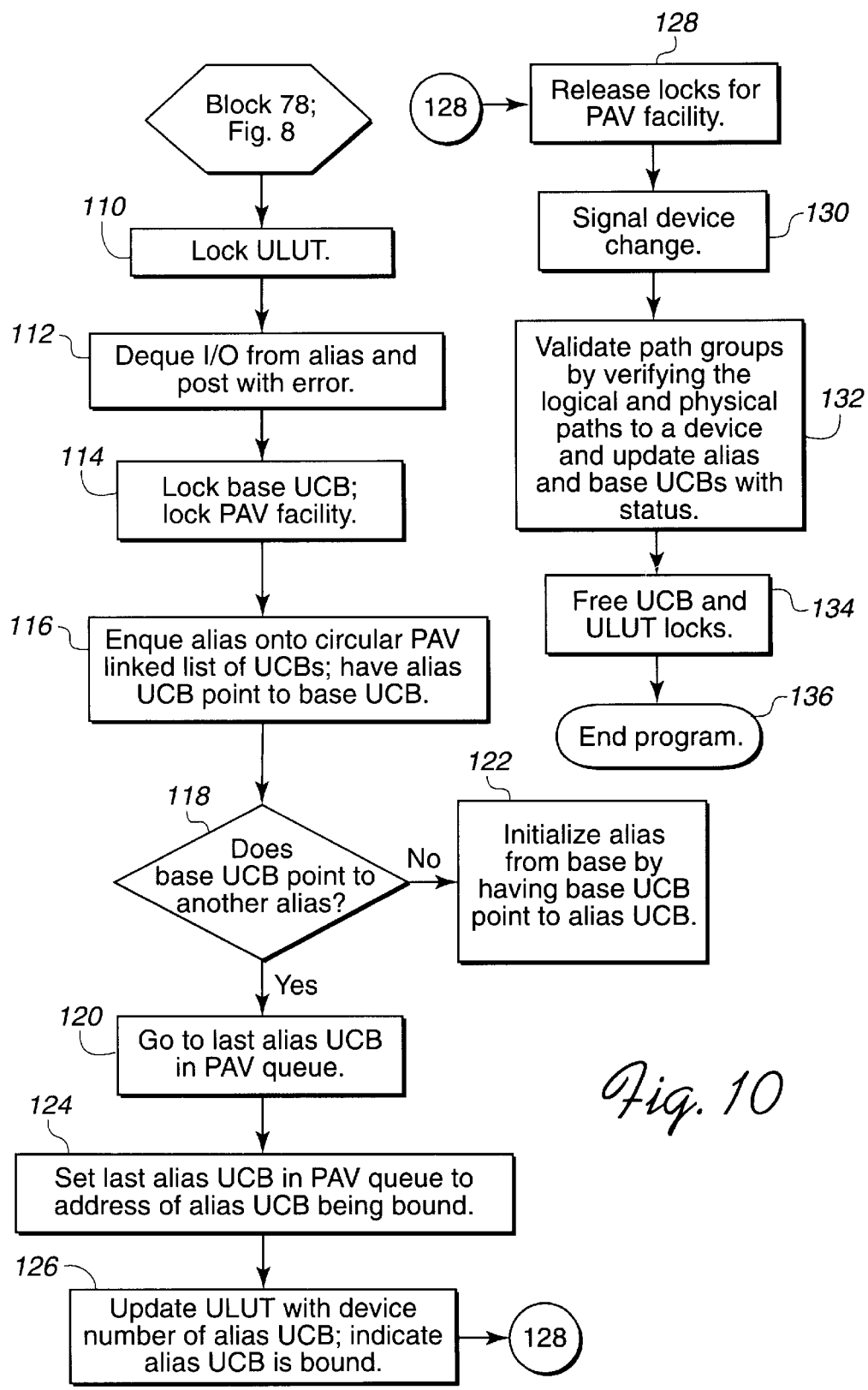
FIG. 10 illustrates logic implemented in a host to bind an alias to a base address in accordance with preferred embodiments of the present invention.

FIG. 10 illustrates logic to bind the new base UCB to the subject alias UCB at block 78 in FIG. 8. Control begins at block 110 which represents the host 16 locking the ULUT 36 to prevent access to the ULUT 36 while it is being updated with the alias to reassign. Control transfers to block 112 which represents the host 16 dequeueing I/O requests toward the alias UCB and posting an error to any such requests to retry later when the alias UCB is bound. Control transfers to block 114 which represents the host 16 locking the base UCB and the PAV facility to block any parallel access requests. Control transfers to block 116 which represents the host 16 enqueueing the reassigned alias UCB in the PAV circular chain illustrated in FIG. 4 so that the alias UCB is in the chain of alias UCBs associated with the new base. In preferred embodiments, the host 16 would enqueue the alias UCB by having the alias UCB address the new base UCB. Control transfers to block 118 which represents the host 16 determining whether the new base UCB points to (addresses) another alias UCB. If not, control transfers to block 122 which represents the host 16 initializing the alias UCB from the new base UCB by having the new base UCB point to the alias UCB.

If there are multiple alias UCBs in the PAV circular queue, then control transfers to block 120 which represents the host 16 determining the last alias UCB in the circular PAV queue. The host 16 may make such a determination by processing a counter indicating the number of alias UCBs for the new base UCB. The host 16 would then go from alias UCB to alias UCB using the pointers included with the new base and alias UCBs to reach the last alias UCB in the chain indicated by the counter value. Other methods for determining the last alias UCB could also be used. After determining the last alias UCB in the PAV circular queue, control transfers to block 124 which represents the host 16 setting the pointer in the last alias UCB in the queue to address the alias UCB to be bound. Control then transfers to block 126 which represents the host 16 updating the device number entry in the ULUT 36 for the bounded alias UCB to indicate that the alias UCB is bound.

Control then transfers to block 128 which represents the host 16 releasing the locks for the PAV facility. The host 16 then, at block 130, signals a change in status for the I/O device 26a, b, c (volume) to which the alias UCB was bound. Control then transfers to block 132 which represents the host 16 validating the path groups by issuing a command to the channel subsystem 20 to verify the logical and physical paths to the I/O device 26a, b, c to which the alias UCB was added and updating the alias and base UCBs with the status information on the I/O device 26a, b, c obtained from the channel subsystem 20. Control transfers to block 134 which represents the host 16 releasing the locks on the UCB and ULUT 36 and then completing the binding program at block 136.

In addition to using the Reassign Alias Address command to reassign alias addresses, a systems operator, after initialization, may bring a device on-line and assign alias addresses to the base address of the devices brought online and take a device off-line and release or unbind the alias addresses from the base for the I/O device 26a, b, c taken off line. For instance, the systems operator may take an I/O device 26a, b, c off-line if the device is not functioning. In preferred embodiments, devices taken off-line do not have any bound alias addresses. In the described embodiment, a VARY command is used to reassign the aliases either off-line or on-line.

Figure 11:
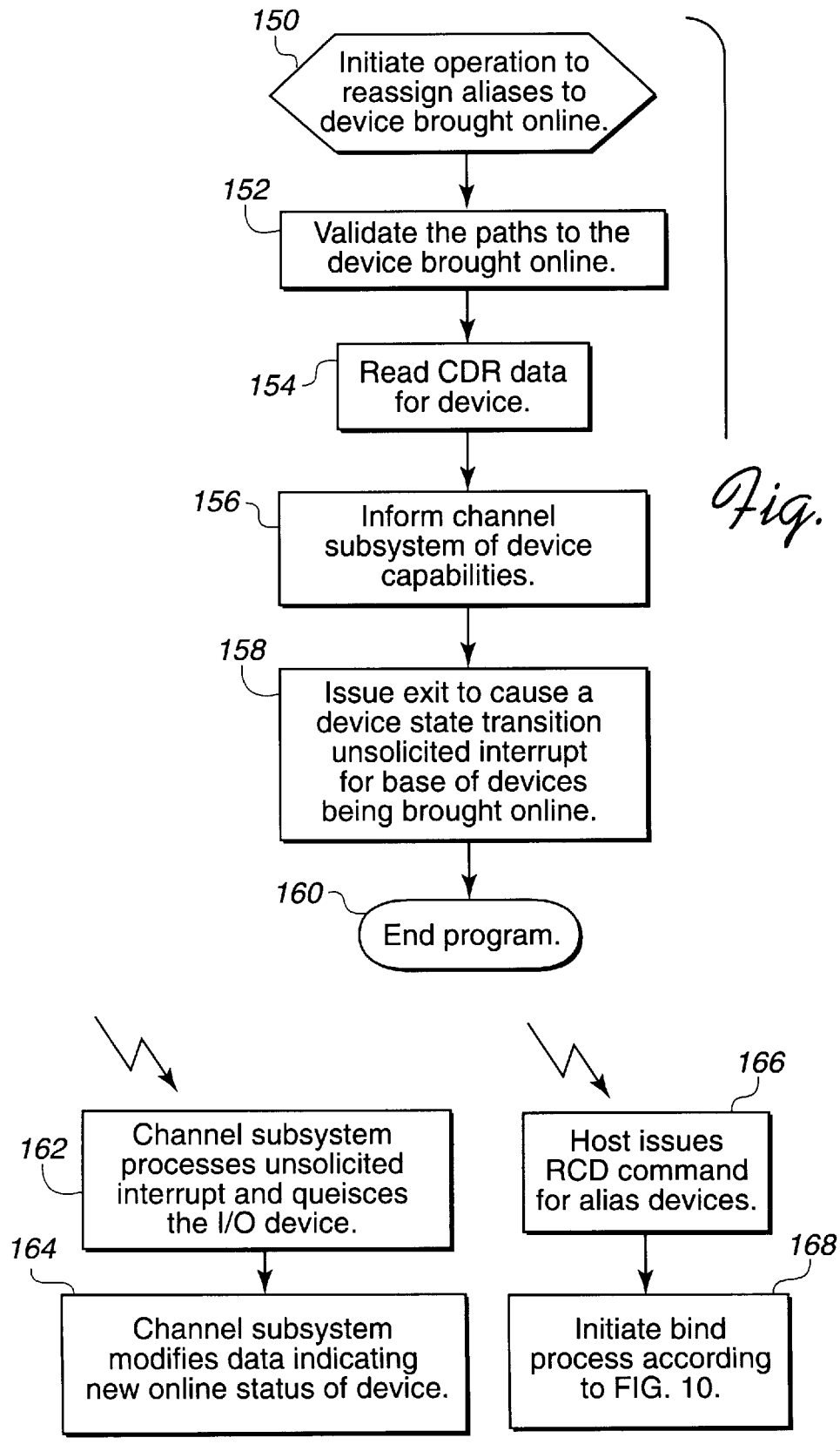
FIG. 11 illustrates logic implemented in a host to reassign an alias address to a device brought online in accordance with preferred embodiments of the present invention.

FIG. 11 illustrates the process to reassign the aliases to the I/O device 26a, b, c when the device 26a, b, c is brought on-line. Control begins at block 150 which represents the host 16 initiating a command to bring an I/O device 26a, b, c online. Control transfers to block 152 which represents the host 16 validating the paths to the I/O device 26a, b, c being brought online. The host system 16 may validate paths by issuing a command to a channel path 35 to associate the channel path 35 with all other channel paths 35 with the same ID. This ID associates channel paths with a volume. The channel subsystem 20 communicates with the volume through the channel paths 35 having the ID. The subchannels 32a, b, c maintain information on the paths that connect to the volume (I/O device 26a, b, c). Control then transfers to block 154 which represents the host 16 issuing a RCD command to obtain the CDR records for the I/O device 26a, b, c. Control transfers to block 154 which represents the host 16 issuing a command to inform the channel subsystem 20 of the capabilities of the host system, i.e., whether the I/O device 26a, b, c being brought on-line is a PAV device. This may be accomplished with the set subsystems characteristics command described in related IBM patent application "Method And System For Dynamically Assigning Addresses To An Input/Output Device," U.S. application Ser. No. 09/167,782, which application was incorporated by reference above. Control then transfers to block 158 which represents the host 16 issuing an exit to cause the storage controller 18 to issue a device state transition for base(s) of device(s) being brought online. The device state transition is an unsolicited interrupt received by the channel subsystem 20 and other hosts 16.

For the channel subsystem 20 side, control transfers to block 162 which represents the channel subsystem 20 processing the unsolicited interrupt. The channel subsystem 20 then quiesces the I/O device 26a, b, c to render the I/O device 26a, b, c inactive. Control then transfers to block 164 which represents the channel subsystem 20 indicating the online status or reassignment of aliases for the I/O device 26a, b, c.

For the host 16 side, at block 166, the host 16 process the unsolicited interrupt to generate a RCD to obtain self-description data for the reassigned alias address. Control then transfers to block 168 which represents the host 16 binding the reassigned alias to the base for the device brought online. For instance, if the alias being considered is not bound, then the host 16 will locate the base alias and bind the alias to be base. If the alias is bound, then the host 16 will verify the binding and unbind and rebind if the binding is not correct.

The logic of FIG. 11 could be generated when a new I/O device is brought online and aliases need to be assigned to such new I/O device. Alternatively, after the systems programmer reassigns alias addresses to different base addresses, a device state transition interrupt of block 158 would be generated to initialize the new binding set by the systems programmer. The logic of FIG. 11, thus, allows for dynamic reassignment of alias addresses. The difference with the binding of alias addresses to the base during a reassignment versus initialization is that during system initialization an attempt is made to bind aliases for all I/O devices 26a, b, c. During reassignment, only those I/O devices 26a, b, c subject to the reassignment, such as the I/O device online are initialized. The logic of FIG. 11, thus, avoids the overhead of having to examine every possible alias associated with every I/O device 26a, b, c in order to bind the reassigned alias addresses. The logic of FIG. 11 causes initialization of the alias to base addresses only for the I/O device subject to the reassignment.

FIG. 12 illustrates logic implemented in the host 16 to vary a device off-line and unbind the alias addresses from the device. In preferred embodiments, off-line devices do not have any bound alias. In preferred embodiments, other settings for the unbound aliases may not be altered, such as dynamic pathing, i.e., multiple channel paths leading to I/O device 26a, b, c and path groups. This reduces the need to reset such settings if the device is subsequently brought back online. Control begins at block 180 which represents the host 16 initiating an operation to reassign the aliases to the device being brought off-line. Control transfers to block 182 which represents the host 16 validating the channel paths 35 to the I/O device 26a, b, c being taken off-line. Control then transfers to block 184 to quiesce the device and mark the device as off-line. When quiescing the device, the host 16 will complete all in-progress I/O operations directed toward the quiesced I/O device and then block any subsequent I/O requests. Control transfers to block 186 to unbind the aliases from the base using the logic of FIG. 10. At block 188, the off-line reassignment program ends. In alternative embodiments, the dynamic pathing and path groups may be disabled.

Conclusion

This concludes the description of the preferred embodiments of the invention. The following describes some alternative embodiments for accomplishing the present invention.

Preferred embodiments were described as implemented in a mainframe operating system, such as the IBM S/390 system, and the IBM 3990 Storage Controller where read/write operations utilize commands such as the define extent command, locate record command, and chain of CCW commands. However, those skilled in the art will appreciate that the use of base and alias addressing to direct I/O operations concurrently to the same volume could apply to any data transfer interface known in the art, including SCSI, ST-506/ST-412, IDE/ATA, Enhanced Small Device Interface (ESDI), floppy disk, parallel port, ATA, EIDE, ATA-2, Fast ATA, Ultra ATA, etc.

The host 16 may be any central electronic complex (CEC) system known in the art including multiple CPUs executing simultaneous operations. The CEC may include one or more operating systems. Thus, one CEC host can appear to operate as several host systems. Each operating system in a single CEC would have its own addressing, thereby making the CEC appear as multiple hosts in a single machine. In preferred embodiments, channels from the CEC are ESCON channels connecting to the storage controller 18.

Preferred embodiments were described in a system for accessing a storage device, such as a DASD. However, the preferred addressing embodiments of the present invention may be used with any type of peripheral I/O device, and are not limited to storage devices. Further, the storage controller 18 may be any type of controller, control unit or processing device for addressing and controlling access to a linked I/O device. Moreover, the host 16 may be any type of processing unit that communicates with the controller or storage controller 18 with respect to address the I/O device.

Preferred embodiments were described as using the define extent and locate commands in the IBM system. However, in alternative embodiments any single or multiple data structures may be used to indicate the extent within which an I/O operation may operate and the restrictions on such operations, i.e., no write. Moreover, the restrictions may include more than just no writes and may encompass specific types of writes or certain read operations. In such case, the storage controller 18 would compare permitted ranges and determine if the permission for any active or queued I/O operation conflicts with the permission for the potential I/O operation. In further embodiments, the storage controller may compare not what is permissible, but the actual parameters of the I/O operation, including the commands and extents where the I/O operation will operate to determine if a conflict exists.

Preferred embodiments were described with respect to a host system that communicates with a channel subsystem, which in turn communicates via channel paths to control units, which access the I/O devices. In alternative embodiments, the data paths may extend from the channel subsystem directly to the I/O device or, alternatively, from the host system directly to the I/O device without the intervention of the channel subsystem and subchannels.

In summary, preferred embodiments in accordance with the present invention disclose a method and system for reassigning addresses. A first processing unit provides at least two base addresses for addressing devices and a plurality of alias addresses. An alias address associated with a base address provides an address for addressing the device addressed by the base address. The first processing unit processes a command transmitted from a second processing unit to reassign an alias address from a first base address to a second base address. The first base address addresses a first device and the second base address addresses a second device. The first processing unit then indicates that the alias address to reassign is not associated with the first base address and is associated with the second base address. The second device addressed by the second base addresses is capable of being addressed by the reassigned alias address. The first processing unit signals the second processing unit after the first processing unit indicates that the alias address was reassigned from the first base address to the second base address.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for reassigning addresses, comprising the steps of:

providing, with a first processing unit, at least two base addresses for addressing devices, and a plurality of alias addresses, wherein an alias address associated with a base address provides an address for addressing the device addressed by the base address;

processing, with the first processing unit, a command, transmitted from a second processing unit, to reassign an alias address from a first base address to a second base address, wherein the first base address addresses a first device and the second base address addresses a second device;

indicating, with the first processing unit, that the alias address to reassign is not associated with the first base address and is associated with the second base address, wherein the second device addressed by the second base addresses is capable of being addressed by the reassigned alias address; and signaling, with the first processing unit, the second processing unit after the first processing unit indicates that the alias address was reassigned from the first base address to the second base address.

2. The method of claim 1, wherein there are additional processing units, further comprising the step of signaling, with the first processing unit, the additional processing units after indicating that the alias address was reassigned from the first base address to the second base address.

3. The method of claim 2, further comprising the steps of:

issuing, with the first processing unit, a busy status signal to one of the second processing unit and additional processing units issuing an input/output (I/O) request to the first device addressed by the alias address to reassign after processing the command to reassign the alias address; and ending the busy signal to allow I/O requests toward the reassigned alias address after the first processing unit indicates that the alias address is associated with the second base address.

4. The method of claim 1, wherein the step of providing base and alias addresses comprises the step of providing, with the first processing unit, a unit address control block (UACB) for each base and alias address including status information on the device addressed by the base and alias addresses, wherein an alias UACB includes a pointer to the associated base UACB; and wherein the step of indicating that the alias address to reassign is not associated with the first alias address and is associated with the second alias address comprises adjusting, with the first processing unit, the pointer in the alias UACB to reassign to point to the second UACB and not point to the first UACB.

5. The method of claim 1, wherein the first processing unit is a controller controlling access to a direct access storage device (DASD), wherein the base addresses address logical volumes in the DASD.

6. A method for reassigning addresses, comprising the steps of:

providing, with a first processing unit, information indicating an association of alias addresses to base addresses, wherein an alias address associated with a base address provides an address for addressing a device addressed by the base address;

initiating a command, with the first processing unit, to a second processing unit to reassign an alias address from a first base address to a second base address, wherein the first base address addresses a first device and the second base address addresses a second device;

processing, with the first processing unit, a signal from the second processing unit;

requesting information, with the first processing unit, from the second processing unit indicating the assignment of the reassigned alias address to the second base address after processing the signal;

indicating, with the first processing unit, that the alias address to reassign is not associated with the first base address; and indicating, with the first processing unit, that the alias address to reassign is associated with the second base address.

7. The method of claim 6, wherein the step of providing information indicating an association of base and alias addresses comprises providing base control blocks indicating base addresses and alias control blocks indicating alias addresses, wherein alias control blocks are bound to related base control blocks, wherein the step of indicating that the alias address to reassign is not associated with the first base address comprises unbinding the alias control block to reassign from the first base control block, and wherein the step of indicating that the alias address to reassign is associated with the second base address comprises binding the alias control block to reassign to a second base control block for the second base address.

8. The method of claim 7, wherein a base control block includes a pointer to a related first alias control block and wherein subsequent related alias control blocks include a pointer to another related alias control block thereby forming a chain of a base control block with all related alias control blocks, wherein the step of indicating that the alias address to reassign is not associated with the first base address comprises removing the alias address to reassign from the chain for the first base control block, and wherein the step of indicating that the alias address to reassign is associated with the second base address comprises adding the alias address to reassign to the chain for the second base control block.

9. The method of claim 6, wherein the first processing unit initiates the command to the second processing unit to reassign the alias address to a base address to a device brought on-line.

10. A method executed within a storage controller for reassigning addresses in a storage controller, wherein the addresses address a storage device unit managed by the storage controller, comprising the steps of:

providing in a memory area accessible to the storage controller at least two base addresses for addressing locations in the storage device unit and a plurality of alias addresses, wherein an alias address associated with a base address provides an address for addressing the location addressed by the base address;

processing a command, transmitted from a computer system over a network communication line, to reassign an alias address from a first base address to a second base address, wherein the first base address addresses a first storage location in the storage device unit and the second base address addresses a second storage location in the storage device unit;

indicating in the memory area that the alias address to reassign is not associated with the first base address and is associated with the second base address, wherein the second storage location addressed by the second base addresses is capable of being addressed by the reassigned alias address; and signaling the computer system over the network communication line after the storage controller indicates that the alias address was reassigned from the first base address to the second base address.

11. The method of claim 10, wherein the base and alias addresses address logical volumes in the storage device unit and wherein the storage device unit includes multiple logical volumes.

12. The method of claim 10, wherein additional computer systems are capable of communicating with the storage controller over the network communication line, further comprising the step of signaling, with the storage controller, the additional computer systems over the network communication line after indicating that the alias address was reassigned from the first base address to the second base address.

13. The method of claim 12, further comprising the steps of:

issuing a busy status signal to one of the computer systems issuing an input/output (I/O) request to the first storage location addressed by the alias address to reassign after processing the command to reassign the alias address; and ending the busy signal to allow I/O requests toward the reassigned alias address after the storage controller indicates in the memory area that the alias address is associated with the second base address.

14. The method of claim 10, wherein the step of providing base and alias addresses in the memory area comprises the step of providing a unit address control block (UACB) for each base and alias address including status information on the storage location addressed by the base and alias addresses, wherein an alias UACB includes a pointer to the associated base UACB; and wherein the step of indicating that the alias address to reassign is not associated with the first alias address and is associated with the second alias address comprises adjusting the pointer in the alias UACB to reassign to point to the second UACB and not point to the first UACB.

15. A system for reassigning addresses that address a first device and a second device and for communicating with a processing unit, comprising:

a control unit in communication with the processing unit;

a memory area accessible to the control unit including information indicating at least two base addresses for addressing devices, and a plurality of alias addresses, wherein an alias address associated with a base address provides an address for addressing the device addressed by the base address;

control logic executed by the control unit, comprising:
(i) means for processing a command, transmitted from the processing unit, to reassign an alias address from a first base address to a second base address, wherein the first base address addresses the first device and the second base address addresses the second device;
(ii) means for processing the information in the memory area to indicate that the alias address to reassign is not associated with the first base address and is associated with the second base address, wherein the second device addressed by the second base address is capable of being addressed by the reassigned alias address; and
(iii) means for signaling the processing unit after indicating that the alias address was reassigned from the first base address to the second base address.

16. The system of claim 15, wherein the means for signaling the processing unit further comprises means for signaling additional processing units after indicating that the alias address was reassigned from the first base address to the second base address.

17. The system of claim 16, wherein the program logic further comprises:

means for issuing a busy status signal to one of the processing units issuing an input/output (I/O) request to the first device addressed by the alias address to reassign after processing the command to reassign the alias address; and means for ending the busy signal to allow I/O requests toward the reassigned alias address after indicating that the alias address is associated with the second base address.

18. The system of claim 15, wherein the base and alias address information in the memory area comprises a unit address control block (UACB) for each base and alias address including status information on the device addressed by the base and alias address, wherein an alias UACB includes a pointer to the associated base UACB, wherein the means for indicating that the alias address to reassign is not associated with the first alias address and is associated with the second alias address comprises means for adjusting the pointer in the alias UACB to reassign to point to the second UACB and not point to the first UACB.

19. The system of claim 15, wherein the first and second devices are logical volumes in a direct access storage device (DASD), and wherein the base and alias addresses address volumes in the DASD.

20. A system for reassigning addresses that address a first device and a second device and for communicating with a control unit, comprising:

a processing unit in communication with the control unit;

a memory area accessible to the processing unit including information indicating an association of alias addresses to base addresses, wherein an alias address associated with a base address provides an address for addressing a device addressed by the base address;

control logic executed by the processing unit, comprising:
(i) means for sending a command to the control unit to reassign an alias address from a first base address to a second base address, wherein the first base address addresses the first device and the second base address addresses the second device;
(ii) means for processing a signal from the control unit;
(iii) means for requesting information from the control unit indicating the assignment of the reassigned alias address to the second base address after processing the signal;
(iv) means for indicating that the alias address to reassign is not associated with the first base address; and
(v) means for indicating that the alias address to reassign is associated with the second base address.

21. The system of claim 20, wherein the base and alias address information stored in the memory area comprises base control blocks indicating base addresses and alias control blocks indicating alias addresses, wherein alias control blocks are bound to related base control blocks, wherein the means for indicating that the alias address to reassign is not associated with the first base address comprises means for unbinding the alias control block to reassign from the first base control block, and wherein the means for indicating that the alias address to reassign is associated with the second base address comprises means for binding the alias control block to reassign to a second base control block for the second base address.

22. The system of claim 21, wherein a base control block includes a pointer to a related first alias control block and wherein subsequent related alias control blocks include a pointer to another related alias control block thereby forming a chain of a base control block with all related alias control blocks, wherein the means for indicating that the alias address to reassign is not associated with the first base address comprises means for removing the alias address to reassign from the chain for the first base control block, and wherein the means for indicating that the alias address to reassign is associated with the second base address comprises means for adding the alias address to reassign to the chain for the second base control block.

23. A storage controller for reassigning addresses that address locations in a storage device unit and for communicating with a computer system over a network communication line, comprising:

a controller processing unit;

a memory area accessible to the controller processing unit including information indicating at least two base addresses for addressing locations in the storage device unit and a plurality of alias addresses, wherein an alias address associated with a base address provides an address for addressing the location addressed by the base address;

control logic executed by the processing unit, comprising:
(i) means for processing a command, transmitted from the computer system over the network communication line, to reassign an alias address from a first base address to a second base address, wherein the first base address addresses a first storage location in the storage device unit and the second base address addresses a second storage location in the storage device unit;
(ii) means for indicating in the memory area that the alias address to reassign is not associated with the first base address and is associated with the second base address, wherein the second storage location addressed by the second base addresses is capable of being addressed by the reassigned alias address; and
(iii) means for signaling the computer system over the network communication line after the storage controller indicates that the alias address was reassigned from the first base address to the second base address.

24. The method of claim 23, wherein the first and second storage locations are logical volumes in the storage device unit.

25. The storage controller of claim 23, wherein additional computer systems are capable of communicating with the storage controller over the network communication line, wherein the control logic executed by the controller processing unit further comprises means for signaling the additional computer systems over the network communication line after indicating that the alias address was reassigned from the first base address to the second base address.

26. The storage controller of claim 23, wherein the control logic further comprises:

means for issuing a busy status signal to one of the computer systems issuing an input/output (I/O) request to the first storage location addressed by the alias address to reassign after processing the command to reassign the alias address; and means for terminating the busy signal to allow I/O requests toward the reassigned alias address after the controller processing unit indicates in the memory area that the alias address is associated with the second base address.

27. The storage controller of claim 23, wherein the means the base and alias address information in the memory area comprises a unit address control block (UACB) for each base and alias address including status information on the storage location addressed by the base and alias addresses, wherein an alias UACB includes a pointer to the associated base UACB; and wherein the means for indicating that the alias address to reassign is not associated with the first alias address and is associated with the second alias address comprises means for adjusting the pointer in the alias UACB to reassign to point to the second UACB and not point to the first UACB.

28. An article of manufacture for use in programming a first processing unit to reassign addresses addressing a first device and second device, the article of manufacture comprising at least one computer readable storage device including at least one computer program embedded therein that causes the first processing unit to perform the steps of:
  providing at least two base addresses for addressing devices, and a plurality of alias addresses, wherein an alias address associated with a base address provides an address for addressing the device addressed by the base address;
  processing a command transmitted from a second processing unit to reassign an alias address from a first base address to a second base address, wherein the first base address addresses the first device and the second base address addresses the second device;
  indicating that the alias address to reassign is not associated with the first base address and is associated with the second base address, wherein the second device addressed by the second base addresses is capable of being addressed by the reassigned alias address; and
  signaling the second processing unit after the first processing unit indicates that the alias address was reassigned from the first base address to the second base address.

29. The article of manufacture of claim 28, wherein there are additional processing units, further comprising the step of signaling the additional processing units after indicating that the alias address was reassigned from the first base address to the second base address.

30. The article of manufacture of claim 29, further comprising the steps of:
  issuing a busy status signal to one of the second processing unit and additional processing units issuing an input/output (I/O) request to the first device addressed by the alias address to reassign after processing the command to reassign the alias address; and
  ending the busy signal to allow I/O requests toward the reassigned alias address after the first processing unit indicates that the alias address is associated with the second base address.

31. The article of manufacture of claim 28, wherein the step of providing base and alias addresses comprises the step of providing a unit address control block (UACB) for each base and alias address including status information on the device addressed by the base and alias addresses, wherein an alias UACB includes a pointer to the associated base UACB; and
  wherein the step of indicating that the alias address to reassign is not associated with the first alias address and is associated with the second alias address comprises adjusting the pointer in the alias UACB to reassign to point to the second UACB and not point to the first UACB.

32. The article of manufacture of claim 28, wherein the first processing unit is a controller controlling access to a direct access storage device (DASD), wherein the base addresses address volumes in the DASD.

33. An article of manufacture for use in programming a first processing unit to reassign addresses addressing a first device and second device, the article of manufacture comprising at least one computer readable storage device including at least one computer program embedded therein that causes the first processing unit to perform the steps of:
  providing information indicating an association of alias addresses to base addresses, wherein an alias address associated with a base address provides an address for addressing a device addressed by the base address;
  initiating a command to a second processing unit to reassign an alias address from a first base address to a second base address, wherein the first base address addresses a first device and the second base address addresses a second device;
  processing a signal from the second processing unit;
  requesting information from the second processing unit indicating the assignment of the reassigned alias address to the second base address after processing the signal;
  indicating that the alias address to reassign is not associated with the first base address; and
  indicating that the alias address to reassign is associated with the second base address.

34. The article of manufacture of claim 33, wherein the step of providing information indicating an association of base and alias addresses comprises providing base control blocks indicating base addresses and alias control blocks indicating alias addresses, wherein alias control blocks are bound to related base control blocks, wherein the step of indicating that the alias address to reassign is not associated with the first base address comprises unbinding the alias control block to reassign from the first base control block, and wherein the step of indicating that the alias address to reassign is associated with the second base address comprises binding the alias control block to reassign to a second base control block for the second base address.

35. The article of manufacture of claim 34, wherein a base control block includes a pointer to a related first alias control block and wherein subsequent related alias control blocks include a pointer to another related alias control block thereby forming a chain of a base control block with all related alias control blocks, wherein the step of indicating that the alias address to reassign is not associated with the first base address comprises removing the alias address to reassign from the chain for the first base control block, and wherein the step of indicating that the alias address to reassign is associated with the second base address comprises adding the alias address to reassign to the chain for the second base control block.

36. The article of manufacture of claim 35, wherein the first processing unit initiates the command to the second processing unit to reassign the alias address to a base address to a device brought on-line.

37. An article of manufacture for use in programming a storage controller to reassign addresses addressing storage locations in a storage device unit, the article of manufacture comprising at least one computer readable storage device including at least one computer program embedded therein that causes the storage controller to perform the steps of:
  providing in a memory area accessible to the storage controller at least two base addresses for addressing locations in the storage device unit and a plurality of alias addresses, wherein an alias address associated with a base address provides an address for addressing the location addressed by the base address;
  processing a command, transmitted from a computer system over a network communication line, to reassign an alias address from a first base address to a second base address, wherein the first base address addresses a first storage location in the storage device unit and the second base address addresses a second storage location in the storage device unit;
  indicating in the memory area that the alias address to reassign is not associated with the first base address and is associated with the second base address, wherein the second storage location addressed by the second base addresses is capable of being addressed by the reassigned alias address; and signaling the computer system over the network communication line after the storage controller indicates that the alias address was reassigned from the first base address to the second base address.

38. The article of manufacture of claim 37, wherein the base and alias addresses address logical volumes in the storage device unit and wherein the storage device unit includes multiple logical volumes.

39. The article of manufacture of claim 37, wherein additional computer systems are capable of communicating with the storage controller over the network communication line, further comprising the step of signaling, with the storage controller, the additional computer systems over the network communication line after indicating that the alias address was reassigned from the first base address to the second base address.

40. The article of manufacture of claim 39, further comprising the steps of:

issuing a busy status signal to one of the computer systems issuing an input/output (I/O) request to the first storage location addressed by the alias address to reassign after processing the command to reassign the alias address; and ending the busy signal to allow I/O requests toward the reassigned alias address after the storage controller indicates in the memory area that the alias address is associated with the second base address.

41. The article of manufacture of claim 37, wherein the step of providing base and alias addresses in the memory area comprises the step of providing a unit address control block (UACB) for each base and alias address including status information on the storage location addressed by the base and alias addresses, wherein an alias UACB includes a pointer to the associated base UACB; and wherein the step of indicating that the alias address to reassign is not associated with the first alias address and is associated with the second alias address comprises adjusting the pointer in the alias UACB to reassign to point to the second UACB and not point to the first UACB.

* * * * *

UNITED STATES PATENT AND TRADEMARK OFFICE
CERTIFICATE OF CORRECTION

PATENT NO.    : 6,167,459
DATED         : December 26, 2000
INVENTOR(S)   : Brent Cameron Beardsley et al.

It is certified that error appears in the above-identified patent and that said Letters Patent is hereby corrected as shown below:

Column 3,
Line 18, delete "123" and insert -- 13 --.

Signed and Sealed this

Thirteenth Day of July, 2004

JON W. DUDAS
*Acting Director of the United States Patent and Trademark Office*